(12) United States Patent
Wiegman

(10) Patent No.: US 12,399,507 B2
(45) Date of Patent: Aug. 26, 2025

(54) SYSTEMS AND METHODS FOR CONTROLLING A FLIGHT BOUNDARY OF AN AIRCRAFT

(71) Applicant: BETA AIR, LLC, South Burlington, VT (US)

(72) Inventor: Herman Wiegman, South Burlington, VT (US)

(73) Assignee: Beta Air LLC, South Burlington, VT (US)

( * ) Notice: Subject to any disclaimer, the term of this patent is extended or adjusted under 35 U.S.C. 154(b) by 165 days.

(21) Appl. No.: 18/371,787

(22) Filed: Sep. 22, 2023

(65) Prior Publication Data

US 2024/0012432 A1 Jan. 11, 2024

Related U.S. Application Data

(63) Continuation-in-part of application No. 17/526,399, filed on Nov. 15, 2021, now Pat. No. 11,803,197.

(51) Int. Cl.
| | | |
|---|---|---|
| *G05D 1/00* | (2024.01) | |
| *B64C 29/00* | (2006.01) | |
| *G05B 13/02* | (2006.01) | |

(52) U.S. Cl.
CPC ......... *G05D 1/106* (2019.05); *B64C 29/0008* (2013.01); *G05B 13/027* (2013.01)

(58) Field of Classification Search
CPC ... G05D 1/106; B64C 29/0008; G05B 13/027
USPC ............................................................ 701/3
See application file for complete search history.

(56) References Cited

U.S. PATENT DOCUMENTS

| | | | | |
|---|---|---|---|---|
| 3,568,187 A | * | 3/1971 | Bechtel | G01S 13/935 342/65 |
| 3,737,119 A | * | 6/1973 | Cheng | B64C 23/04 244/1 N |
| 5,345,241 A | * | 9/1994 | Huddle | G01C 21/005 342/63 |
| 7,471,996 B2 | * | 12/2008 | Bartel | F02C 9/28 701/4 |
| 7,706,932 B2 | * | 4/2010 | Morales De La Rica | G05D 1/106 701/4 |
| 8,090,483 B2 | * | 1/2012 | Pepitone | B64D 31/00 701/32.7 |

(Continued)

OTHER PUBLICATIONS

Notice of Allowance dated Sep. 26, 2024 for related U.S. Appl. No. 17/852,299, entitled "Transition Gauge for Electric Aircraft" (17 pages).

*Primary Examiner* — Luis A Martinez Borrero
(74) *Attorney, Agent, or Firm* — Lee & Hayes, P.C.

(57) ABSTRACT

A system for controlling a flight boundary of an aircraft. The system includes a flight controller communicatively connected to the aircraft. The flight controller is configured to receive a plurality of flight data linked with the aircraft, determine a flight boundary for the aircraft as a function of the plurality of flight data, set an aircraft movement limit as a function of the flight boundary, receive a thrust envelope, and generate a control signal for the aircraft as a function of the aircraft movement limit and the thrust envelope. The control signal is limits the aircraft to remain within the flight boundary. A method for controlling a flight boundary of an aircraft is also provided.

20 Claims, 10 Drawing Sheets

(56) References Cited

U.S. PATENT DOCUMENTS

| | | | | |
|---|---|---|---|---|
| 8,442,701 B2 * | 5/2013 | Blechen | G05D 1/0833 | 701/3 |
| 8,527,119 B2 * | 9/2013 | Chaptal | G08G 5/52 | 701/3 |
| 8,670,881 B2 * | 3/2014 | DeJonge | G05D 1/0661 | 701/5 |
| 8,918,235 B1 * | 12/2014 | Eggold | G05D 1/0072 | 244/75.1 |
| 10,037,706 B1 * | 7/2018 | Cutler | G08G 5/54 | |
| 10,479,484 B2 * | 11/2019 | Huynh | B64C 13/42 | |
| 10,755,587 B2 | 8/2020 | Cutler | | |
| 10,890,928 B2 * | 1/2021 | Soma | G08G 5/52 | |
| 11,249,493 B2 * | 2/2022 | Murata | G08G 5/32 | |
| 11,373,543 B1 * | 6/2022 | Moeykens | B64U 70/95 | |
| 11,377,201 B1 * | 7/2022 | Auerbach | G05D 1/0833 | |
| 11,417,225 B1 * | 8/2022 | Moeykens | G08G 5/76 | |
| 11,427,305 B1 * | 8/2022 | Wiegman | B64D 27/31 | |
| 11,435,761 B1 * | 9/2022 | Wiegman | B64D 27/34 | |
| 11,435,762 B1 * | 9/2022 | Auerbach | B64D 27/31 | |
| 11,465,734 B1 * | 10/2022 | Wiegman | B64D 31/10 | |
| 11,592,846 B1 * | 2/2023 | Wiegman | G05D 1/106 | |
| 11,634,236 B2 * | 4/2023 | Hedrick | B64D 31/06 | 701/3 |
| 11,651,695 B2 * | 5/2023 | Lax | G01C 21/20 | 701/3 |
| 11,674,407 B2 * | 6/2023 | Feulner | F01D 11/24 | 701/3 |
| 11,803,197 B2 * | 10/2023 | Wiegman | G08G 5/34 | |
| 2007/0235267 A1 * | 10/2007 | Liebert | B60T 7/108 | 188/71.7 |
| 2008/0133069 A1 * | 6/2008 | Morales De La Rica | G05D 1/106 | 244/175 |
| 2011/0202205 A1 * | 8/2011 | Pepitone | B64D 31/00 | 701/3 |
| 2012/0215505 A1 * | 8/2012 | Srivastav | G01C 23/005 | 703/6 |
| 2014/0232568 A1 * | 8/2014 | Pennell | G05D 1/0816 | 340/967 |
| 2015/0066240 A1 * | 3/2015 | Das Adhikary | G08G 5/53 | 701/1 |
| 2015/0134151 A1 * | 5/2015 | Swann | B64D 45/00 | 701/3 |
| 2015/0197335 A1 * | 7/2015 | Dekel | B64U 30/10 | 701/5 |
| 2015/0262492 A1 * | 9/2015 | Barnes | B64D 47/08 | 701/301 |
| 2016/0171896 A1 * | 6/2016 | Buchmueller | G08G 5/25 | 701/3 |
| 2016/0216130 A1 * | 7/2016 | Abramson | G01C 21/3423 | |
| 2016/0347479 A1 | 12/2016 | O'Neil et al. | | |
| 2017/0069214 A1 * | 3/2017 | Dupray | G08G 5/56 | |
| 2017/0106953 A1 * | 4/2017 | Cole | B63C 9/01 | |
| 2019/0005828 A1 * | 1/2019 | Costas | G08G 5/723 | |
| 2020/0023955 A1 * | 1/2020 | Worsham, II | B64C 27/57 | |
| 2020/0273357 A1 * | 8/2020 | Chartier | G08G 5/21 | |
| 2020/0346769 A1 * | 11/2020 | Knapp | G01C 21/20 | |
| 2020/0388169 A1 * | 12/2020 | Barr | G05D 1/101 | |
| 2021/0056859 A1 * | 2/2021 | Tachiiwa | G08G 5/80 | |
| 2021/0089055 A1 * | 3/2021 | Tran | G08G 5/55 | |
| 2021/0104164 A1 * | 4/2021 | Erignac | G08G 5/51 | |
| 2021/0110723 A1 * | 4/2021 | Tazume | G05D 1/695 | |
| 2021/0339885 A1 * | 11/2021 | Doherty | G05D 1/617 | |
| 2021/0358310 A1 * | 11/2021 | Sachs | G08G 5/22 | |
| 2022/0058959 A1 * | 2/2022 | Ota | H04W 4/025 | |
| 2022/0327937 A1 * | 10/2022 | Ayhan | G08G 5/55 | |
| 2022/0334595 A1 * | 10/2022 | Famularo | G05D 1/101 | |
| 2023/0083902 A1 * | 3/2023 | Wiegman | G05B 23/02 | 244/3 |
| 2023/0084918 A1 * | 3/2023 | Wiegman | G08G 5/55 | 701/3 |
| 2023/0152823 A1 * | 5/2023 | Wiegman | G08G 5/34 | |
| 2023/0227146 A1 * | 7/2023 | Richter | B64C 13/16 | 701/3 |
| 2024/0004404 A1 * | 1/2024 | Wiegman | G05D 1/085 | |

* cited by examiner

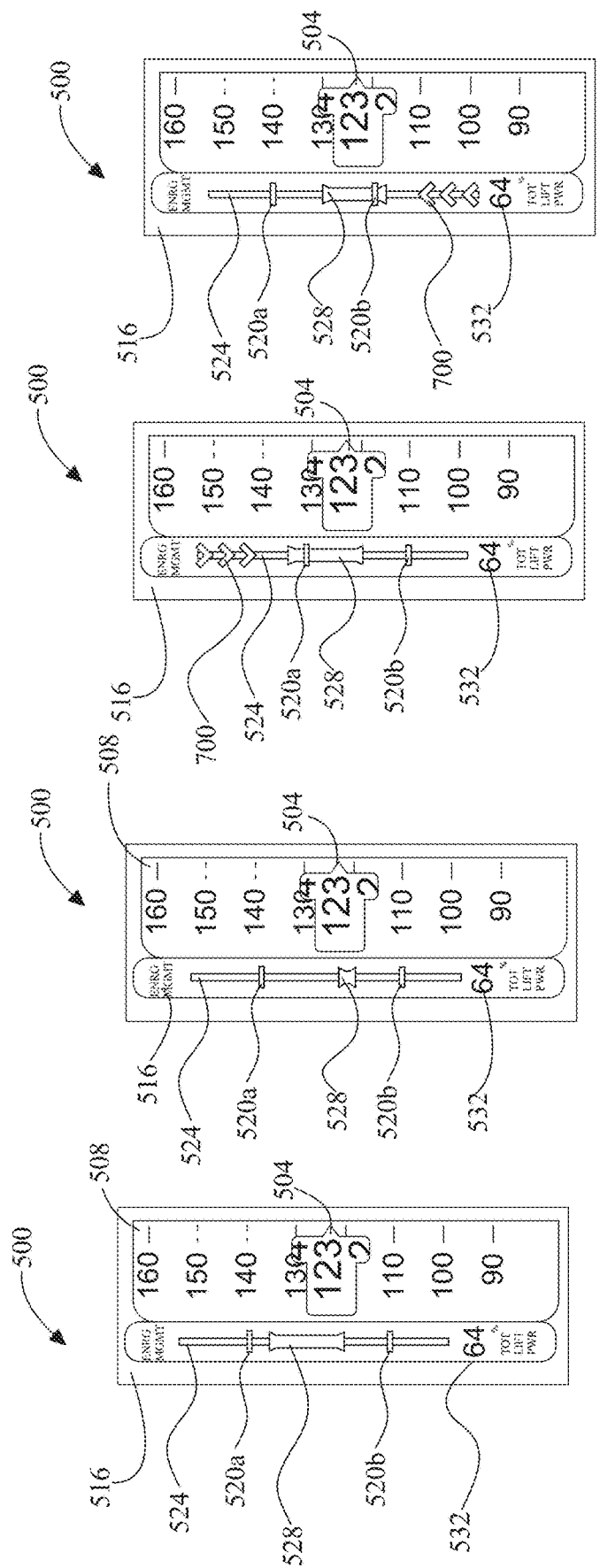

SYSTEMS AND METHODS FOR CONTROLLING A FLIGHT BOUNDARY OF AN AIRCRAFT

CROSS-REFERENCE TO RELATED APPLICATIONS

This application is a continuation-in-part of Non-provisional application Ser. No. 17/526,399, filed on and entitled "SYSTEMS AND METHODS FOR CONTROLLING A FLIGHT BOUNDARY OF AN AIRCRAFT," the entirety of which is incorporated herein by reference. This application is a continuation-in-part of Non-provisional application Ser. No. 17/852,299, filed on Jun. 28, 2022, and entitled "TRANSITION GAUGE FOR ELECTRIC AIRCRAFT," the entirety of which is incorporated herein by reference.

FIELD OF THE INVENTION

The present invention generally relates to the field of aviation. In particular, the present invention is directed to systems and methods for controlling a flight boundary of an aircraft.

BACKGROUND

It is important to have the capability to accurately determine permissible boundaries for aircrafts to fly within. However, this can be a challenge given the many factors which may have to be taken into consideration when determining and implementing aircraft flight trajectories.

SUMMARY OF THE DISCLOSURE

In an aspect, a system for controlling a flight boundary of an aircraft includes a pilot control configured to interface with a pilot and transmit a thrust envelope, a flight controller, wherein the flight controller is communicatively connected to the pilot control and an aircraft, wherein the flight controller is configured to receive a plurality of flight data linked with the aircraft, wherein a flight datum of the plurality of flight data comprises a flight component datum informing on the operation of a flight component, wherein the flight component comprises a propulsor component, determine a flight boundary for the aircraft as a function of the plurality of flight data, set an aircraft movement limit as a function of the flight boundary, wherein setting an aircraft movement limit comprises receiving instruction, which includes an aircraft identifier and a specified value of the aircraft movement limit, receive the thrust envelope, wherein the thrust envelope comprises an instruction to set a thrust envelope, generate a control signal for the aircraft as a function of the aircraft movement limit and the thrust envelope, wherein the control signal limits the aircraft to remain within the flight boundary, and an electric propulsor communicatively connected to the flight controller and configured to receive the control signal and control operation as a function of the control signal.

In another aspect, a method for controlling a flight boundary of an aircraft includes interfacing, by a pilot control, with a pilot, transmitting, by the pilot control, a thrust envelope, receiving, by a flight controller communicatively connected to the pilot control and an aircraft, wherein the aircraft may comprise a hybrid-electric aircraft, a plurality of flight data linked with the aircraft, wherein a flight datum of the plurality of flight data comprises a flight component datum informing on the operation of a flight component, wherein the flight component comprises a propulsor component, determining, by the flight controller, a flight boundary for the aircraft as a function of the plurality of flight data, setting, by the flight controller, an aircraft movement limit as a function of the flight boundary, wherein setting an aircraft movement limit comprises receiving instruction, which includes an aircraft identifier and a specified value of the aircraft movement limit, receiving, by the flight controller, the thrust envelope, wherein the thrust envelope comprises an instruction to set thrust envelope parameter, and generating, by the flight controller, a control signal for the aircraft as a function of the aircraft movement limit and the thrust envelope, wherein the control signal limits the aircraft to remain within the flight boundary, receiving, using an electric propulsor communicatively connected to the flight controller, the control signal, and controlling operation of the electric propulsor as a function of the control signal.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is schematic diagram of the propulsor gauge in accordance with one or more embodiments of the present disclosure;

FIG. 6 is schematic diagram of the propulsor gauge in accordance with one or more embodiments of the present disclosure;

FIG. 7 is schematic diagram of the propulsor gauge in accordance with one or more embodiments of the present disclosure;

FIG. 8 is schematic diagram of the propulsor gauge in accordance with one or more embodiments of the present disclosure;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for controlling a flight boundary of an aircraft. In an embodiment, a flight controller is used to implement these systems and methods. Aspects of the present disclosure can be used to determine and or generate a flight boundary for a particular aircraft based on considerations unique to that aircraft. Aspects of the present disclosure can also be used to set an aircraft movement limit for aircraft as function of the determined flight boundary. This is so, at least in part, because a particular pilot's identity, background and/or experience can be used in the setting of aircraft movement limit. Aspects of the present disclosure can generate a control signal based on the set aircraft movement limit and a thrust envelope to make a decision on whether or not to accept thrust envelope. This can be advantageous in maintaining a predetermined flight boundary as well as providing a safeguard against pilot error and/or inexperience. Aspects of the present disclosure desirably allow for updating flight boundary and/or aircraft movement limit(s) pre-flight and in-flight based on current data and information. Exemplary embodiments illustrating aspects of the present disclosure are described below in the context of several specific examples.

Figure 1:
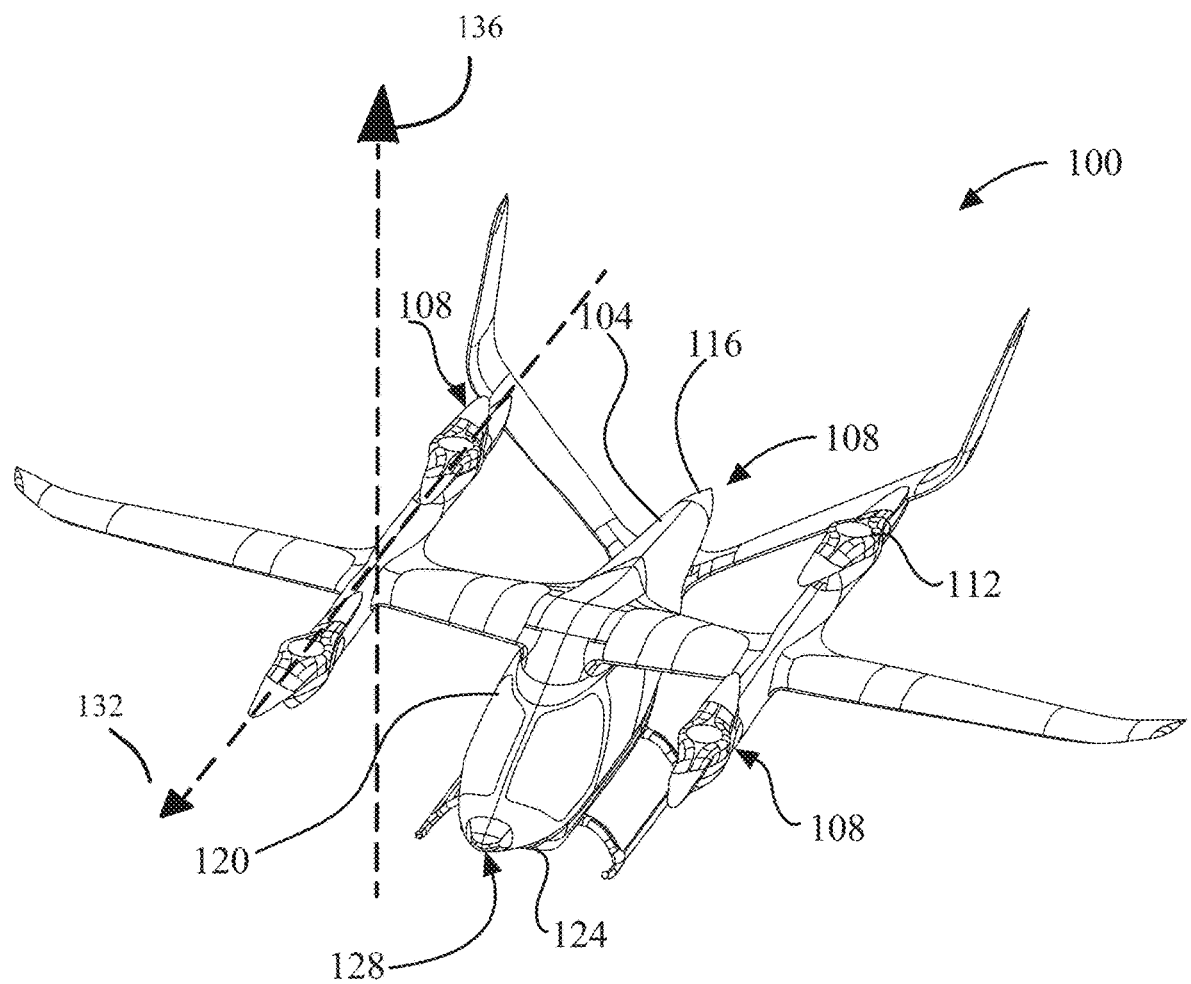
FIG. 1 is a diagrammatic representation of an exemplary embodiment of an aircraft.

Referring now to FIG. 1, an exemplary embodiment of an aircraft 100 which operates in conjunction with, incorporates and/or includes a system for controlling flight boundary of an aircraft is illustrated. As used in this disclosure, an "aircraft" is any vehicle that may fly by gaining support from the air. As a non-limiting example, aircraft may include airplanes, helicopters, commercial, personal and/or recreational aircrafts, instrument flight aircrafts, drones, electric aircrafts, airliners, rotorcrafts, vertical takeoff and landing (VTOL) aircrafts, jets, airships, blimps, gliders, paramotors, quad-copters, unmanned aerial vehicles (UAVs) and the like. In an embodiment, aircraft may be an electric aircraft. As used in this disclosure, an "electric aircraft is an electrically powered aircraft such as one powered by one or more electric motors or the like. In an embodiment, electric (or electrically powered) aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Including one or more propulsion and/or flight components. Electric propulsion assembly may include any electric propulsion assembly (or system) as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 1, as used in this disclosure, a "vertical take-off and landing (VTOL) aircraft" is one that can hover, take off, and land vertically. An "electric vertical takeoff and landing aircraft" or "eVTOL aircraft", as used in this disclosure, is an electrically powered aircraft typically using an energy source, of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight. In an embodiment, aircraft 100 may be a hybrid-electric aircraft and may be powered by a hybrid-electric power system. A "hybrid-electric aircraft," as used in the present disclosure, is a type of hybrid aircraft that combines an internal combustion engine (ICE) system with an electric propulsion system.

Still referring to FIG. 1, aircraft 100, in some embodiments, may generally include a fuselage 104, a flight component 108 (or a plurality of flight components 108), a pilot control 120, a flight controller 124, and a sensor 128 (or a plurality of sensors 128). In one embodiment, flight components 108 may include at least a lift component 112 (or a plurality of lift components 112) and at least a pusher component 116 (or a plurality of pusher components 116). In some embodiments, and as described further below with reference to at least FIG. 2A, aircraft 100 operates in conjunction with, incorporates and/or includes a system for controlling flight boundary thereof including at least a flight controller.

With continued reference to FIG. 1, as used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber.

Still referring to FIG. 1, it should be noted that an illustrative embodiment is presented only, and this disclosure in no way limits the systems and methods as disclosed herein. In embodiments, fuselage 104 may be configurable based on the needs of the aircraft per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground. In some embodiments, winglets may be provided at terminal ends of the wings which can provide improved aerodynamic efficiency and stability in certain flight situations. In some embodiments, the wings may be foldable to provide a compact aircraft profile, for example, for storage, parking and/or in certain flight modes.

With continued reference to FIG. 1, aircraft 100 may include a plurality of flight components 108. As used in this disclosure a "flight component" is a component that promotes flight and guidance of an aircraft. Flight component 108 may include energy sources, power sources, thrust components, lift components, control links to one or more elements, fuses, and/or mechanical couplings used to drive and/or control any other flight component. Flight component 108 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. Flight component 108 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery pack, a battery, a battery cell, or a plurality of battery cells connected in series into a module and each module connected in series or in parallel with other modules. Configuration of an energy source containing connected modules may be designed to meet an energy or power requirement and may be designed to fit within a designated footprint in an aircraft.

Still referring to FIG. 1, in an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an aircraft. Further, in an embodiment, mechanical coupling may be used to join two pieces of rotating aircraft components.

Still referring to FIG. 1, in an embodiment, plurality of flight components 108 of aircraft 100 may include at least a lift component 112 and at least a pusher component 116 which are described in further detail later herein with reference to at least FIG. 2A. In an embodiment, aircraft 100 may include a pilot control 120 which is also described further with reference to at least FIG. 2A. In an embodiment, pilot control 120 may be located in a cockpit, or the like, of aircraft 100. In another embodiment, pilot control 120 may be remote from aircraft 100, for example, at a flight simulator, or the like.

With continued reference to FIG. 1, in some embodiments, electric aircraft 100 is communicatively coupled to flight controller 124 which is described further below. As used in this disclosure a "flight controller" is a computing device of a plurality of computing devices dedicated to data storage, security, distribution of traffic for load balancing, and flight instruction. In embodiments, flight controller may be installed in an aircraft, may control the aircraft remotely, and/or may include an element installed in the aircraft and a remote element in communication therewith. Flight controller 124, in an embodiment, may be located within fuselage 104 of aircraft. In accordance with some embodiments, flight controller may be configured to operate a vertical lift flight (upwards or downwards, that is, takeoff or landing), a fixed wing flight (forward or backwards), a transition between a vertical lift flight and a fixed wing flight, and a combination of a vertical lift flight and a fixed wing flight.

Still referring to FIG. 1, in an embodiment, and without limitation, flight controller 124 may be configured to operate a fixed-wing flight capability. A "fixed-wing flight capability" can be a method of flight wherein the plurality of laterally extending elements generate lift. For example, and without limitation, fixed-wing flight capability may generate lift as a function of an airspeed of aircraft 100 and one or more airfoil shapes of the laterally extending elements. As a further non-limiting example, flight controller 124 may operate the fixed-wing flight capability as a function of reducing applied torque on lift (propulsor) component 112. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift (propulsor) components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference.

In an embodiment, and still referring to FIG. 1, flight controller 124 may be configured to perform a reverse thrust command. As used in this disclosure a "reverse thrust command" is a command to perform a thrust that forces a medium towards the relative air opposing aircraft 100. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 1, flight controller 124 may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift component of the plurality of lift components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCRAFT," the entirety of which is incorporated herein by reference.

With continued reference to FIG. 1, aircraft 100 may include at least a sensor (or a plurality of sensors) 128 which may be efficaciously utilized with any of the systems and methods for controlling flight boundary of an aircraft as disclosed in the entirety of the present disclosure. Sensor 128 may include any sensor or noise monitoring circuit described in this disclosure. Sensor 128, in some embodiments, may be communicatively connected to flight controller 124. Sensor 128, in an embodiment, may be configured to sense a characteristic of pilot control 120. Sensor may be a device, module, and/or subsystem, utilizing any hardware, software, and/or any combination thereof to sense a characteristic and/or changes thereof, in an instant environment, for instance without limitation a pilot control 120, which the sensor is proximal to or otherwise in a sensed communication with, and transmit information associated with the characteristic, for instance without limitation digitized data. Sensor 120 may be mechanically and/or communicatively coupled to aircraft 100, including, for instance, to at least flight controller 124, flight component(s) 108 and pilot control 120. Sensor 128 may be configured to sense a characteristic associated with at least a pilot control 120. An environmental sensor may include without limitation one or more sensors used to detect ambient temperature, barometric pressure, and/or air velocity. Sensor 128 may include without limitation gyroscopes, accelerometers, inertial measurement unit (IMU), and/or magnetic sensors, one or more humidity sensors, one or more oxygen sensors, or the like. Additionally or alternatively, sensor 120 may include at least a geospatial sensor. Sensor 128 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 100 for both critical and non-critical functions. Sensor may be incorporated into aircraft or be remote.

Still referring to FIG. 1, in some embodiments, sensor 128 may be configured to sense a characteristic associated with any flight component and/or pilot control described in this disclosure. Non-limiting examples of sensor 128 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 128 may sense a characteristic as an analog measurement, for instance, yielding a continuously variable electrical potential indicative of the sensed characteristic. In these cases, sensor 128 may additionally comprise an analog to digital converter (ADC) as well as any additionally circuitry, such as without limitation a Wheatstone bridge, an amplifier, a filter, and the like. For instance, in some cases, sensor 128 may comprise a strain gage configured to determine loading of one or more aircraft components, for instance landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 100, for instance without limitation a computing system, a pilot display, and a memory component. Alternatively or additionally, sensor 128 may sense a characteristic of a flight component 108 and/or pilot control 120 digitally. For instance in some embodiments, sensor 128 may sense a characteristic through a digital means or digitize a sensed signal natively. In some cases, for example, sensor 128 may include a rotational encoder and be configured to sense a rotational position of a flight component and/or pilot control; in this case, the rotational encoder digitally may sense rotational "clicks" by any known method, such as without limitation magnetically, optically, and the like. Sensor 128 may include any of the sensors as disclosed in the present disclosure. Sensor 128 may include a plurality of sensors. Any of these sensors may be located at any suitable position in or on aircraft 100, as needed or desired. Sensor(s) 128 may efficaciously include any of the sensors as described in the present disclosure, as needed or desired. Aircraft 100 may have a longitudinal axis 132, running from the rear to the front of the aircraft; anything aligned with and/or along an axis parallel to the longitudinal axis 132 may be described for the purposes of this disclosure as along and/or aligned with the longitudinal axis 132. Aircraft 100 may have a vertical axis 136, running from the top to the bottom of the aircraft, which may be orthogonal to the longitudinal axis 132; anything aligned with and/or along an axis parallel to the vertical axis 136 may be described for the purposes of this disclosure as along and/or aligned with the vertical axis 136. Aircraft 100 may have a transverse axis (not shown), running from wingtip to wingtip of the aircraft, and/or in direction orthogonal to the longitudinal axis 132 and the vertical axis 136; anything aligned with and/or along an axis parallel to the transverse axis may be described for the purposes of this disclosure as along and/or aligned with the transverse axis.

Figure 2A:
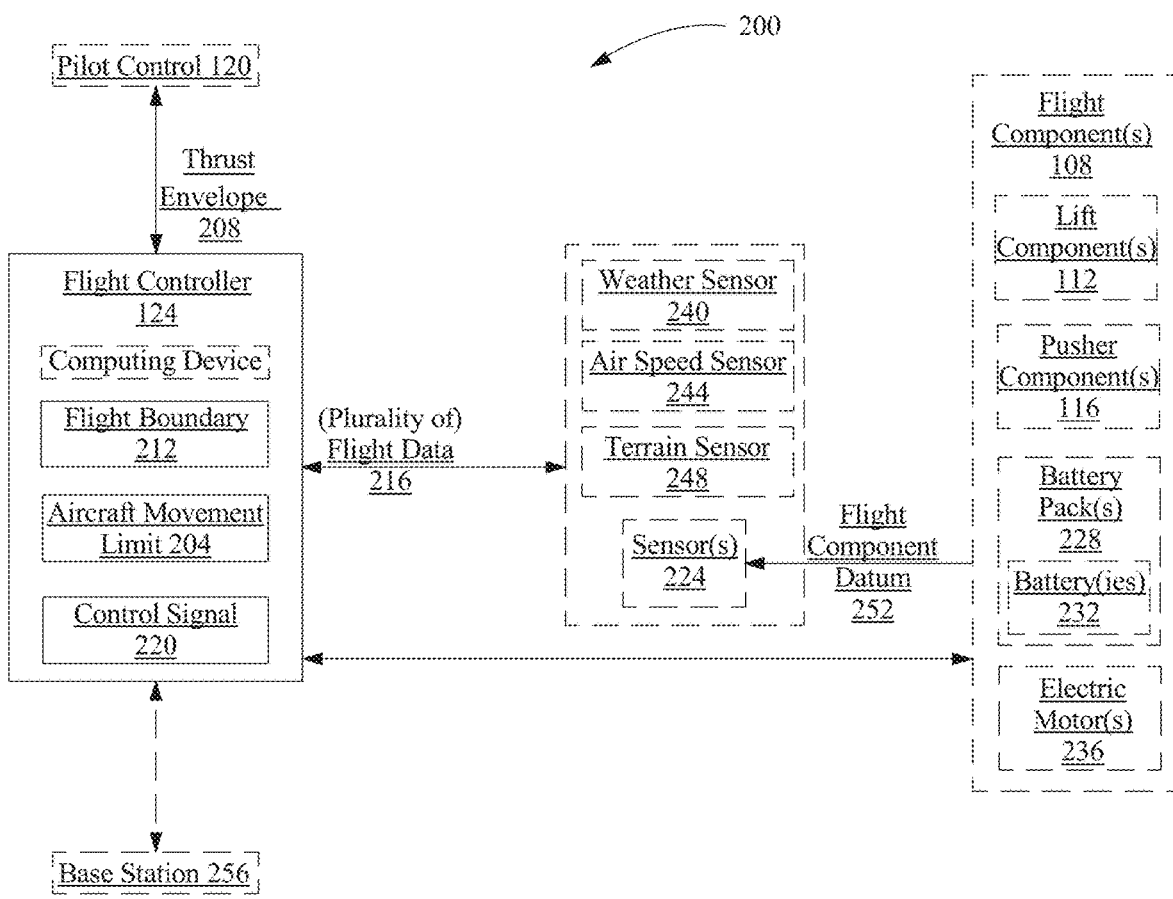
FIG. 2A is a block diagram of an exemplary embodiment of a system for controlling a flight boundary of an aircraft.

Referring now to FIG. 2A, an exemplary embodiment of a system 200 for controlling a flight boundary of an aircraft, such as in some embodiments aircraft 100 of FIG. 1, is illustrated. In some embodiments, system 200 includes a controller such as flight controller 124 communicatively connected to aircraft. Flight controller 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

Still referring to FIG. 2A, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2A, as used in this disclosure, "communicatively connected" is an attribute of a connection, attachment or linkage, wired or wireless, direct or indirect, between two or more components, circuits, devices, systems, and the like, which allows for reception and/or transmittance of data and/or signal(s) therebetween. Data and/or signals therebetween may include, without limitation, electrical, electromagnetic, visual, audio, radio waves, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 2A, any controller, such as flight controller 124, as disclosed herein may efficaciously be utilized in conjunction with any of the embodiments of the present disclosure. For example, and without limitation, to control or regulate flight boundary(ies) and/or movement limits of aircraft. In an embodiment, controller, such as flight controller 124, may be onboard aircraft. In another embodiment, controller, such as flight controller 124, may be remote from aircraft. In yet another embodiment, controller, such as flight controller, may have a portion onboard aircraft and another portion remote from aircraft. In still another embodiment, multiple controllers located at a plurality of sites may be efficaciously utilized, as needed or desired. As used in this disclosure a "flight controller" is a computing device of a plurality of computing devices dedicated to data storage, security, distribution of traffic for load balancing, and flight instruction. In embodiments, flight controller may be installed in an aircraft, may control the aircraft remotely, and/or may include an element installed in the aircraft and a remote element in communication therewith. As used in this disclosure, "remote" is a spatial separation between two or more elements, systems, components or devices. Stated differently, two elements may be remote from one another if they are physically spaced apart. In an embodiment, flight controller 124 may include a proportional-integral-derivative (PID) controller.

Referring now to FIG. 2A, an exemplary embodiment of a system 200 for controlling flight boundary of an aircraft, such as in some embodiments aircraft 100 of FIG. 1, is illustrated. Aircraft may efficaciously include any of the aircrafts as disclosed herein. In an embodiment, aircraft may be an electric aircraft. In another embodiment, aircraft may be an eVTOL aircraft. In yet another embodiment, aircraft may be a hybrid-electric aircraft.

Still referring to FIG. 2A, in some embodiments system 200 for controlling flight boundary of aircraft includes at least a controller such as flight controller 124. Flight controller 124 may include any of the controllers or flight controllers as disclosed in the present disclosure such as, and without limitation, a flight controller as described below. Flight controller 124 is communicatively connected to aircraft, such as without limitation, aircraft 100 of FIG. 1.

Still referring to FIG. 2A, in some embodiments, flight controller 124 is configured to receive a plurality of flight data 216 linked with aircraft, determine a flight boundary 212 for aircraft as a function of plurality of flight data 216, set an aircraft movement limit (AML) 204 as a function of flight boundary 212, receive a thrust envelope 208, and generate a control signal 220 for aircraft as a function of aircraft movement limit 204 and thrust envelope 208. Control signal 220 limits aircraft to remain within flight boundary 212 (and/or is configured to limit movement of aircraft to within flight boundary 212).

Continuing to refer to FIG. 2A, as discussed further herein including below, in an embodiment, pilot control 120 or the like may be communicatively connected to flight controller 124 and may provide or transmit thrust envelope 208 to flight controller 124. In an embodiment, one or more sensors (or a plurality of sensors) may be communicatively connected to flight controller 124 and provide or transmit plurality of flight data 216 to flight controller 124. These sensors may include, without limitation, at least a sensor 224 communicatively and/or mechanically connected to at least a flight component 108 of aircraft and configured to detect at least a flight component datum 252 of flight component(s) 108. Flight component(s) may include, without limitation, lift component(s) 112, pusher component(s) 116, battery pack(s) 228 including one or more batteries 232, and electric motor(s) 236, among others. Other sensors may be configured to detect a phenomenon external to aircraft and may include, without limitation, a weather or environment sensor 240, an air speed or wind sensor 244, a terrain or landscape sensor 248, among others.

With continued reference to FIG. 2A, and as also discussed further herein including below, in an embodiment, flight boundary 212 may define a three dimensional space for a flight trajectory of the aircraft. In an embodiment, determining flight boundary 212 for aircraft may further include training a machine-learning process with training data correlating aircraft flight data and aircraft flight boundary data, and generating flight boundary 212 for aircraft as a function of the machine-learning process. In an embodiment, plurality of flight data 216 may include a weather datum. In an embodiment, plurality of flight data 216 may include a location datum. In an embodiment, plurality of flight data 216 may include a flight component datum. In an embodiment, plurality of flight data 216 may include an energy capacity datum. In an embodiment, plurality of flight data 216 may include an aircraft identity datum. In an embodiment, flight data 216 may include information on a pilot's identity and/or experience.

Still referring to FIG. 2A, in some embodiments, a base station 256 may be communicatively connected to flight controller 124 and may provide or transmit aircraft movement limit 204 to flight controller 124. Flight controller 124 is configured to set an aircraft movement limit (AML) 204 as a function of flight boundary 212. In an embodiment, base station 256 may set aircraft movement limit 204. Base station 256 may be any suitable site, external or remote to aircraft, which is capable of transmitting signals to flight controller 124 and/or aircraft based on information available and/or accessible to it. Base station 256 may include, without limitation, an air traffic control (ATC) facility, an airport, a landing strip, pad or deck, a landing site, a takeoff site, a recharging station, a refueling station, a fleet management facility, a weather station, and the like, among others. Base station may include a computing device such as, and without limitation, a server, a network, a tablet, a mobile device, a graphical user interface (GUI), and the like, among others. Communication between base station 256 and flight controller 124 may be facilitated by, for example and without limitation, wireless means such as a satellite, a mobile network, radio waves, and the like, among others. In some embodiments, flight controller 124 may be at base station 256. In some embodiments, flight controller 124 and base station 256 may cooperate to determine and/or generate flight boundary 212 and/or aircraft movement limit 204.

Still referring to FIG. 2A, as used in this disclosure, an "aircraft movement limit" is associated with some limit to the movement of an aircraft (e.g., where a pilot's instructions will be obeyed only to the degree permitted by the aircraft movement limit or its value, if any). In an embodiment, aircraft movement limit may be associated with without limitation, a manned aircraft. For example, and without limitation, aircraft movement limit may be a position limit associated with the aircraft, including (but not limited to) an attitude limit, an altitude limit, a latitude limit, and a longitude limit. In some cases, position limit may be relative to some boundary (e.g., the aircraft's position should remain over a body of water or some smaller area within that body of water). In some instances, position limit may be relative to some other aircraft (e.g., two or more aircraft should remain a certain distance apart). In some other cases, aircraft movement limit may be a velocity limit. Some examples include, without limitation, a forward velocity limit, a lateral velocity limit, a rotational velocity limit (e.g., about a yaw or vertical axis), a vertical velocity limit, or a limit associated with a desired direction of movement (e.g., indicated by an input device such as a joystick). Other examples of an aircraft movement limit may include, without limitation, a limit to some other rate associated with aircraft, such as an attitude rate limit. In some other cases, an aircraft movement limit may include, without limitation, an acceleration limit. As used in this disclosure, an "aircraft movement limit datum" or a "value" for an aircraft movement limit is a value, datum or information that conveys aircraft movement limit. For example, and without limitation, aircraft movement limit datum may include a value for a threshold, minimum and/or maximum altitude, speed, velocity, acceleration, and the like, among others, for aircraft.

Still referring to FIG. 2A, thrust envelope 208 may be generated by pilot control 120, or the like, and provided or transmitted to flight controller 124. Pilot control 120 may be communicatively connected to flight controller 124. Aircraft may be a manned and/or unmanned aircraft. That is, pilot may be onboard aircraft or at a remote location, for example, and without limitation, a flight simulator, or the like, among others. As used in this disclosure, a "thrust envelope," refers to the lift gauge, lift lever gauge, or transition indicator, may include a pilot input and/or a signal and/or command generated thereby, may be an instruction provided by a pilot to control an aircraft. For example, and without limitation, thrust envelope 208 may include instructions from a pilot to set, change and/or maintain an aircraft's speed, velocity, acceleration, position, altitude, flight path, flight trajectory, flight plan, attitude, pitch, yaw, roll, flight angle, angle of attack, and the like, among others. Thrust envelope 108 may also include, without limitation, a pilot's instruction to transition between any flight modes such as, and without limitation, hover, forward flight, lift flight, fixed wing flight, takeoff, landing, glide, and the like, among others. Thrust envelope may include any information about electric aircraft that may be relevant to the transition between flight modes, examples include, without limitation, an indication of the current flight mode, any aircraft movement data, an indication to begin transitioning flight modes, or the like. Thrust envelope may be inputted through a pilot input device, which may be communicatively connected or attached to flight controller. Thrust envelope also may be any mechanism that allows a pilot to control operation of electric aircraft. Additionally, thrust envelope may also be used to control one or more flight components during the transition between flight modes.

Still referring to FIG. 2A, as used in this disclosure, a "pilot control" is a mechanism or means which allows a pilot to monitor and control operation of aircraft such as its flight components (for example, and without limitation, pusher component, lift component and other components such as propulsion components). For example, and without limitation, pilot control 120 may include a collective, inceptor, foot brake, steering and/or control wheel, joystick, control stick, pedals, throttle levers, and the like. Pilot control 120 may be configured to translate a pilot's desired torque for each flight component of the plurality of flight components, such as and without limitation, pusher component 116 and lift component 112. Pilot control 120 may be configured to control, via inputs and/or signals such as from a pilot, the pitch, roll, and yaw of the aircraft. Pilot control may be available onboard aircraft or remotely located from it, as needed or desired.

Still referring to FIG. 2A, as used in this disclosure a "collective control" or "collective" is a mechanical control of an aircraft that allows a pilot to adjust and/or control the pitch angle of plurality of flight components 108. For example and without limitation, collective control may alter and/or adjust the pitch angle of all of the main rotor blades collectively. For example, and without limitation pilot control 120 may include a yoke control. As used in this disclosure a "yoke control" is a mechanical control of an aircraft to control the pitch and/or roll. For example and without limitation, yoke control may alter and/or adjust the roll angle of aircraft as a function of controlling and/or maneuvering ailerons. In an embodiment, pilot control 120 may include one or more foot-brakes, control sticks, pedals, throttle levels, and the like thereof. In another embodiment, and without limitation, pilot control 120 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of aircraft, perpendicular to the wings. For example, and without limitation, a positive yawing motion may include adjusting and/or shifting nose of aircraft to the right. Principal axis may include a pitch axis. As used in this disclosure a "pitch axis" is an axis that is directed towards the right laterally extending wing of aircraft. For example, and without limitation, a positive pitching motion may include adjusting and/or shifting nose of aircraft upwards. Principal axis may include a roll axis. As used in this disclosure a "roll axis" is an axis that is directed longitudinally towards nose of aircraft, parallel to fuselage. For example, and without limitation, a positive rolling motion may include lifting the left and lowering the right wing concurrently. Pilot control 120 may be configured to modify a variable pitch angle. For example, and without limitation, pilot control 120 may adjust one or more angles of attack of a propulsor or propeller.

Still referring to FIG. 2A, in some embodiments, aircraft movement limit 204 may override thrust envelope 208 as implemented via control signal 220. In some embodiments, the eventual decision on deciding and implementing flight boundary 212 and/or aircraft movement limit 204 typically rests with flight controller 124 through generation of control signal 220.

With continued reference to FIG. 2A, in some embodiments, flight boundary 212 for aircraft is determined by flight controller 124 as a function of at least flight data 216 which, in some embodiments, is linked with or associated with aircraft. As used in this disclosure, "flight data" is information on any flight aspect associated with a particular aircraft. This may be used to determine or generate flight boundary 212 with aircraft movement limits unique to a particular aircraft. For example, and without limitation, flight data 216 may include aircraft flight plan, current, projected and/or actual weather, and/or external environment, conditions along one or more possible flight plans which may include projected and actual flight plans, flight trajectory, type of terrain aircraft is over and intends to fly over, local wind conditions along flight plan, local air turbulence and projected and/or turbulence along flight plan, other data relating to conditions external to aircraft such as, without limitation, moving and/or stationary objects or obstacles and information on air traffic, specific aircraft information, and the like among others. Specific aircraft information may include, without limitation, status of various flight components including health and diagnostics thereof, current and/or projected degradation of any flight component, number of energy sources, number and/or type of flight components (e.g., without limitation, lift components, pusher components, battery packs, motors, and the like, among others), number of built-in redundancies, type of aircraft (e.g., without limitation, electric, eVTOL, hybrid-electric, internal combustion), landing gear configuration(s), types of flight mode available to aircraft, and the like, among others. Other examples of flight data may include, without limitation, current and/or projected speed, velocity, acceleration, direction of travel, attitude, pitch, yaw, roll, flight angle, angle of attack, and the like, among others. In an embodiment, flight data may also include pilot identity and/or experience. For example, and without limitation, different flight boundaries 212 and/or aircraft movement limits 204 may be determined, generated and/or set for pilot's with different flying backgrounds and/or experiences.

Still referring to FIG. 2A, various kinds of flight data 216 may affect the determination of flight boundary 212 which may evolve as a function of time and change to accommodate updated flight data as the flight of aircraft progresses. For example, and without limitation, flight boundary 212 may need adjustment if the precision of navigation of aircraft needs to be taken into consideration based on updated flight data 216. This may be compensated for by allowing a flight boundary that now accounts for a greater navigational error rate. For example, and without limitation, if it is windy or turbulent, aircraft may be blown off course, buffeted around, etc., which may mean it cannot stay within a tolerance of an intended route which would be possible in calmer weather. Degradation of motors, batteries, sensory equipment, etc. (or weather-introduced imprecision or error rates in sensory acquisition/communication) could have a similar effect. Each of these effects and/or flight data elements may be input to machine-learning models, and each corresponding adjustment to flight boundary may be output by a machine-learning model, for instance as trained using training examples correlating such effects and/or flight data elements to boundaries that bound likely resulting paths and/or result in safe and/or effective flight maneuvers.

Still referring to FIG. 2A, in another example, and without limitation, adjustment of flight boundary 212 may also be dependent on the likelihood of some category of failure, based on information provided by flight data 216, that could cause a deviation or problem if not compensated for. This may involve also taking into consideration modification of the aircraft route, or the areas within which the route can be plotted, based on possible results of failure. For example, and without limitation, if a crash or emergency landing is likely, maybe aircraft could be limited to areas with low population density, places where it could land safely on a strip of road or (if it has floats) on water, places where it is not going to crash into another craft, and the like. Each of these effects and/or flight data elements may be input to machine-learning models, and each corresponding adjustment to flight boundary may be output by a machine-learning model, for instance as trained using training examples correlating such effects and/or flight data elements to boundaries that bound likely resulting paths and/or result in safe and/or effective flight maneuvers.

Still referring to FIG. 2A, as used in this disclosure, a "flight boundary" is a boundary, surface or perimeter of a three-dimensional space in which aircraft movement should be limited. This flight boundary may change with time and, in some embodiments, is specific to a particular aircraft and/or its operation. Flight boundary may define a boundary for aircraft's entire flight from a takeoff site to its final destination, which may include stops therebetween. It should be noted that flight boundary includes a boundary "over" a certain region but is not limited to it. Space of aircraft movement may be visualized, for example and without limitation, with respect to an x-y-z Cartesian (or spherical, cylindrical, and the like, among others) system. Thus flight boundary may have lines or surfaces in such a system which form flight boundary. Flight boundary 212 may be considered as a generalized movement limit for an aircraft based on a case-by-case evaluation and determination as provided by a controller, computing device, or the like, such as flight controller 124.

Still referring to FIG. 2A, in some embodiments, flight controller 124 may accept thrust envelope 208 if it appropriately maintains aircraft within flight boundary 212 and/or aircraft movement limit(s) 204, or override (or reject) thrust envelope 208 if it would inappropriately, unsafely, and/or undesirably lead to aircraft movement outside of determined flight boundary 212 and/or aircraft movement limit(s) 204. In some embodiments, as needed or desired, flight controller 124 may set and maintain flight boundary 208 independently of any thrust envelope or input, and system may thus autonomously control determination and implementation of flight boundary 212 based on plurality of flight data 216 (i.e. thrust envelope 208 may be omitted from such embodiments).

With continued reference to FIG. 2A, in some embodiments, flight controller 124 is configured to generate control signal 220 as a function of aircraft movement limit 204 and thrust envelope 208. Control signal 220 is configured to limit movement of aircraft to within flight boundary 212 and/or aircraft movement limit(s) 204. As used in this disclosure, "control signal" is a control command or decision directed to aircraft and/or its components. For example, and without limitation, control signal may instruct and/or control operation of one or more flight components 108 such as, and without limitation, lift component(s) 112 and pusher component(s) 116 to modify aircraft speed, velocity, yaw, pitch, roll, altitude, attitude, lift, thrust, mode of flight, energy consumption rate, and the like, among others. Control signal 220 may also be used to decide whether to accept or reject a thrust envelope 208, for example, in view of determined flight boundary 212 and/or aircraft movement limit(s) 204.

Still referring to FIG. 2A, flight controller 124 may accept thrust envelope 208 if it appropriately maintains aircraft within flight boundary 212 and/or aircraft movement limit(s) 204, or override (or reject) thrust envelope 208 if it would inappropriately, unsafely, and/or undesirably lead to aircraft movement outside of determined flight boundary 212 and/or aircraft movement limit(s) 204. This decision may be conveyed via control signal 220 which is indicative of, in some embodiments, at least determining whether or not thrust envelope 208 is compatible with flight boundary 212 and/or aircraft movement limit(s) 204.

With continued reference to FIG. 2A, in some embodiments, one or more sensors (or a plurality of sensors) may be provided. These sensors may be communicatively connected to flight controller 124 and may provide or transmit plurality of flight data 216 and/or other data to flight controller 124. Sensors may include, without limitation, at least a sensor 224, weather or environment sensor 240, air speed or wind sensor 244, terrain or landscape sensor 248, and the like, among others.

Still referring to FIG. 2A, as used in this disclosure, a "sensor" is a device that is configured to detect a phenomenon and transmit information related to the detection of the phenomenon. For example, in some cases a sensor may transduce a detected phenomenon, such as without limitation, voltage, current, speed, direction, force, torque, temperature, pressure, and the like, into a sensed signal. At least a sensor 224 may include one or more sensors which may be the same, similar or different. At least a sensor 224 may include a plurality of sensors which may be the same, similar or different. At least a sensor 224 may include one or more sensor suites with sensors in each sensor suite being the same, similar or different. At least a sensor 224 may include, for example and without limitation, a current sensor, a voltage sensor, a resistance sensor, a Wheatstone bridge, a gyroscope, an accelerometer, a torque sensor, a magnetometer, an inertial measurement unit (IMU), a pressure sensor, a force sensor, a thermal sensor, a proximity sensor, a displacement sensor, a vibration sensor, a light sensor, an optical sensor, a pitot tube, a speed sensor, and the like, among others. Sensors in accordance with embodiments disclosed herein may be configured detect a plurality of data, such as and without limitation, data relating to battery life cycle, battery consumption rate, flight path obstacles, weather, wind velocity, terrain identification, aircraft velocity, wind turbulence, battery temperature, and the like, among others.

Still referring to FIG. 2A, in an embodiment, at least a sensor 224 may be communicatively connected, connected, or coupled to at least a flight component 108 to detect a flight component datum 252 of at least a flight component 108 and to transmit it to flight controller 124. At least a sensor 224 may be included in system 200. As used in this disclosure, a "flight component datum" is information on a flight component of an aircraft. This may include, without limitation, information on performance and/or operation of flight component. Flight component datum may include any element of data identifying and/or describing the parameters that may affect the flight, performance and/or operation of aircraft. For example, and without limitation, flight component datum may include data describing battery performance and flight plan of aircraft. In an embodiment, flight component datum 252 and/or (plurality of) flight data 216 may include an energy capacity datum. As used in this disclosure, an "energy capacity datum" is information on energy or power available for aircraft. For example, and without limitation, energy capacity datum may include information on energy capacity (or remaining energy capacity) of an energy source, such as and without limitation, one or more batteries or battery packs of aircraft. Flight component datum 252 and/or (plurality of) flight data 216 may include, without limitation, data or information on any flight component degradation, number of flight components, number of energy sources, battery packs, or batteries onboard aircraft, type of aircraft, and the like, among others.

With continued reference to FIG. 2A, at least a flight component 108 may include a propulsor, a propeller, a motor, rotor, a rotating element, electrical energy source, battery, and the like, among others. Each flight component may be configured to generate lift and flight of electric aircraft. In some embodiments, at least a flight component 108 may include one or more lift components 112, one or more pusher components 116, one or more battery packs 228 including one or more batteries 232, and one or more electric motors 236. In an embodiment, at least a flight component 108 may include a battery 232. Alternatively or additionally, in an embodiment, at least a flight component 108 may include a propulsor. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. As used in this disclosure, a "battery pack" is a set of any number of identical (or non-identical) batteries or individual battery cells. These may be configured in a series, parallel or a mixture of both configuration to deliver a desired electrical flow, current, voltage, capacity, or power density, as needed or desired. A battery may include, without limitation, one or more cells, in which chemical energy is converted into electricity (or electrical energy) and used as a source of energy or power.

Still referring to FIG. 2A, as used in this disclosure, an "energy source" is a source (or supplier) of energy (or power) to a power one or more components. For example, and without limitation, energy source may provide energy to a power source (e.g. electric motor 236) that in turn drives and/or controls any other aircraft component such as other flight components. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, a battery pack, or a plurality of battery cells connected in series into a module and each module connected in series or in parallel with other modules. Configuration of an energy source containing connected modules may be designed to meet an energy or power requirement and may be designed to fit within a designated footprint in an aircraft (e.g. aircraft 100 of FIG. 1).

In an embodiment, and still referring to FIG. 2A, an energy source may be used to provide a steady supply of electrical flow or power to a load over the course of a flight by an aircraft. For example, an energy source may be capable of providing sufficient power for "cruising" and other relatively low-energy phases of flight. An energy source may also be capable of providing electrical power for some higher-power phases of flight as well, particularly when the energy source is at a high state of charge (SOC), as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Lithium ion (Li-ion) batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2A, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

Continuing to refer to FIG. 2A, energy sources, battery packs, batteries, sensors, sensor suites and/or associated methods which may efficaciously be utilized in accordance with some embodiments are disclosed in U.S. Nonprovisional application Ser. No. 17/111,002, filed on Dec. 3, 2020, entitled "SYSTEMS AND METHODS FOR A BATTERY MANAGEMENT SYSTEM INTEGRATED IN A BATTERY PACK CONFIGURED FOR USE IN ELECTRIC AIRCRAFT", U.S. Nonprovisional application Ser. No. 17/108,798, filed on Dec. 1, 2020, and entitled "SYSTEMS AND METHODS FOR A BATTERY MANAGEMENT SYSTEM INTEGRATED IN A BATTERY PACK CONFIGURED FOR USE IN ELECTRIC AIRCRAFT", and U.S. Nonprovisional application Ser. No. 17/320,329, filed on May 14, 2021, and entitled "SYSTEMS AND METHODS FOR MONITORING HEALTH OF AN ELECTRIC VERTICAL TAKE-OFF AND LANDING VEHICLE", the entirety of each one of which is incorporated herein by reference.

With continued reference to FIG. 2A, other energy sources, battery packs, batteries, sensors, sensor suites and/or associated methods which may efficaciously be utilized in accordance with some embodiments are disclosed in U.S. Nonprovisional application Ser. No. 16/590,496, filed on Oct. 2, 2019, and entitled "SYSTEMS AND METHODS FOR RESTRICTING POWER TO A LOAD TO PREVENT ENGAGING CIRCUIT PROTECTION DEVICE FOR AN AIRCRAFT", U.S. Nonprovisional application Ser. No. 17/348,137, filed on Jun. 15, 2021, and entitled "SYSTEMS AND METHODS FOR RESTRICTING POWER TO A LOAD TO PREVENT ENGAGING CIRCUIT PROTECTION DEVICE FOR AN AIRCRAFT", U.S. Nonprovisional application Ser. No. 17/008,721, filed on Sep. 1, 2020, and entitled "SYSTEM AND METHOD FOR SECURING BATTERY IN AIRCRAFT", U.S. Nonprovisional application Ser. No. 16/948,157, filed on Sep. 4, 2020, and entitled "SYSTEM AND METHOD FOR HIGH ENERGY DENSITY BATTERY MODULE", U.S. Nonprovisional application Ser. No. 16/948,140, filed on Sep. 4, 2020, and entitled "SYSTEM AND METHOD FOR HIGH ENERGY DENSITY BATTERY MODULE", and U.S. Nonprovisional application Ser. No. 16/948,141, filed on Sep. 4, 2020, and entitled "COOLING ASSEMBLY FOR USE IN A BATTERY MODULE ASSEMBLY", the entirety of each one of which is incorporated herein by reference.

With continued reference to FIG. 2A, in some embodiments, at least a sensor 224 may be communicatively connected to lift component(s) 112 to receive flight component datum 252. Lift component 112 may include a propulsor, a propeller, a blade, a motor, a rotor, a rotating element, an aileron, a rudder, arrangements thereof, combinations thereof, and the like. Each lift component 112, when a plurality is present, of plurality of flight components 108 is configured to produce, in an embodiment, substantially upward and/or vertical thrust such that aircraft moves upward.

Still referring to FIG. 2A, as used in this disclosure a "lift component" is a component and/or device used to propel a craft upward by exerting downward force on a fluid medium, which may include a gaseous medium such as air or a liquid medium such as water. Lift component 112 may include any device or component that consumes electrical power on demand to propel an aircraft in a direction or other vehicle while on ground or in-flight. For example, and without limitation, lift component 112 may include a rotor, propeller, paddle wheel and the like thereof, wherein a rotor is a component that produces torque along the longitudinal axis, and a propeller produces torque along the vertical axis. In an embodiment, lift component 112 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 112 may include a rotating power-driven hub, to which are attached several radial airfoil-section blades such that the whole assembly rotates about a longitudinal axis. Blades may be configured at an angle of attack. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. In an embodiment, and without limitation, angle of attack may include a fixed pitch lifters. As used in this disclosure a "fixed pitch lifters" is a variable and/or moveable angle between a chord line of a blade and relative wind. As used in this disclosure a "variable angle" is an angle that is moveable from an attachment point. In an embodiment, angle of attack be configured to produce a fixed pitch angle. As used in this disclosure a "fixed pitch angle" is a fixed angle between a cord line of a blade and the rotational velocity direction. In an embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 2A, lift component 112 may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. In an embodiment, and without limitation, lift component 112 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 108 such as a power source(s) may apply a torque on lift component 112 to produce lift.

In an embodiment and still referring to FIG. 2A, a plurality of lift components 112 of the plurality of flight components 108 may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift components oriented in the geometric shape of a hexagon, wherein each of the six lift components are located along the six vertices of the hexagon shape. In an embodiment, and without limitation, quad copter orientation may include a first set of lift components and a second set of lift components, wherein the first set of lift components and the second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 100 (see e.g., FIG. 1). In another embodiment, and without limitation, the second set of lift components may be oriented along a line oriented 135° from the longitudinal axis, wherein the first set of lift components line and the second set of lift components are perpendicular to each other.

Still referring to FIG. 2A, pusher component 116 and lift component 112 (of flight component(s) 108) may include any such components and related devices as disclosed in U.S. Nonprovisional application Ser. No. 16/427,298, filed on May 30, 2019, entitled "SELECTIVELY DEPLOYABLE HEATED PROPULSOR SYSTEM", U.S. Nonprovisional application Ser. No. 16/703,225, filed on Dec. 4, 2019, entitled "AN INTEGRATED ELECTRIC PROPULSION ASSEMBLY", U.S. Nonprovisional application Ser. No. 16/910,255, filed on Jun. 24, 2020, entitled "AN INTEGRATED ELECTRIC PROPULSION ASSEMBLY", U.S. Nonprovisional application Ser. No. 17/319,155, filed on May 13, 2021, entitled "AIRCRAFT HAVING REVERSE THRUST CAPABILITIES", U.S. Nonprovisional application Ser. No. 16/929,206, filed on Jul. 15, 2020, entitled "A HOVER AND THRUST CONTROL ASSEMBLY FOR DUAL-MODE AIRCRAFT", U.S. Nonprovisional application Ser. No. 17/001,845, filed on Aug. 25, 2020, entitled "A HOVER AND THRUST CONTROL ASSEMBLY FOR DUAL-MODE AIRCRAFT", U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT", and U.S. Nonprovisional application Ser. No. 17/321,662, filed on May 17, 2021, entitled "AIRCRAFT FOR FIXED PITCH LIFT", the entirety of each one of which is incorporated herein by reference.

With continued reference to FIG. 2A, in some embodiments, at least a sensor 224 may be communicatively connected to pusher component(s) 116 to receive flight component datum 252. Pusher component 116 may include a propulsor, a propeller, a blade, a motor, a rotor, a rotating element, an aileron, a rudder, arrangements thereof, combinations thereof, and the like. Each pusher component 116, when a plurality is present, of the plurality of flight components 108 is configured to produce, in an embodiment, substantially forward and/or horizontal thrust such that the aircraft moves forward.

Still referring to FIG. 2A, ss used in this disclosure, a "pusher component" is a component that pushes and/or thrusts an aircraft through a medium. As a non-limiting example, pusher component 116 may include a pusher propeller, a paddle wheel, a pusher motor, a pusher propulsor, and the like. Additionally, or alternatively, pusher flight component may include a plurality of pusher flight components. Pusher component 116 is configured to produce a forward thrust. As a non-limiting example, forward thrust may include a force to force aircraft to in a horizontal direction along the longitudinal axis. As a further non-limiting example, pusher component 116 may twist and/or rotate to pull air behind it and, at the same time, push aircraft 100 (FIG. 1) forward with an equal amount of force. In an embodiment, and without limitation, the more air forced behind aircraft, the greater the thrust force with which the aircraft is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 2A, in an embodiment, at least a sensor 224 may include a torque sensor communicatively connected to a propulsor, lift component or pusher component to detect its performance. For example, and without limitation, torque sensor may include a load cell, such as an in-line torque load cell, a device to measure torque using existing current measurement and/or voltage estimates at an inverter or motor level, such as with a current sensor, voltage sensor, or any other component suitable for sensing torque. In an embodiment, and without limitation, torque may be a measure of a force which rotates propulsor. At least a sensor 224, in an embodiment, may include a speed sensor, for example, and without limitation, as speed sensor to detect rotational speed of propulsor in revolutions per minute (RPM). Some torque and speed sensors which may efficaciously be utilized in accordance with certain embodiments are disclosed in U.S. Nonprovisional application Ser. No. 17/361,463, filed on Jun. 29, 2021, entitled "SYSTEM AND METHOD FOR AIRSPEED ESTIMATION UTILIZING PROPULSOR DATA IN ELECTRIC VERTICAL TAKE-OFF AND LANDING AIRCRAFT", the entirety of which is incorporated herein by reference.

Still referring to FIG. 2A, in some embodiments, at least a sensor 224 may be communicatively connected to power source or electric motor(s) 236 to receive flight component datum 252. As used in this disclosure a "power source" is a source that drives and/or controls any flight component and/or other aircraft component. For example, and without limitation power source may include motor 236 that operates to move one or more lift components 112 and/or one or more pusher components 116, to drive one or more blades, or the like thereof. Motor(s) 236 may be driven by direct current (DC) electric power and may include, without limitation, brushless DC electric motors, switched reluctance motors, induction motors, or any combination thereof. Motor(s) 236 may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

With continued reference to FIG. 2A, embodiments as disclosed herein encompass sensors which may be used to detect information on aircraft components, such as flight components, as well as sensors which may be used to detect information regarding other phenomena associated with aircraft (e.g. aircraft 100 of FIG. 1). These other sensors may include, without limitation, a weather sensor, an external environment sensor, a wind sensor, an air speed sensor, a location sensor, a position sensor, a terrain sensor, a landscape sensor, an obstacle sensor, and the like, among others, and may be provided on aircraft or, in some cases, remote from it, as suitable.

Still referring to FIG. 2A, in an embodiment, plurality of flight data 216 may include an external environment datum. As used in this disclosure, an "external environment datum" is any information on a condition external to an aircraft which may affect aircraft flight. For example, and without limitation, weather and wind conditions and any turbulence around aircraft. These conditions may be detected by one or more sensors on or onboard aircraft. Additionally, data on such conditions, and the like, along aircraft's projected trajectory may be provided by remote sensors. Certain environmental and weather sensors which may efficaciously be utilized in accordance with some embodiments are disclosed in U.S. Nonprovisional application Ser. No. 17/374,055, filed on Jul. 13, 2021, entitled "SYSTEM AND METHOD FOR AUTOMATED AIR TRAFFIC CONTROL", the entirety of which is incorporated herein by reference.

With continued reference to FIG. 2A, in an embodiment, system 200 may include weather sensor 240 configured to detect a weather datum external to aircraft. Weather sensor 240 may provide a weather datum to flight controller 124. Plurality of flight data 216 may include weather datum. Weather sensor 240 may be on or onboard aircraft or remote from it.

Still referring to FIG. 2A, as used in this disclosure, a "weather sensor" may include any sensor configured to detect, sense and/or measure a weather phenomenon in an environment exterior to aircraft. For example, and without limitation, weather sensor may be configured to detect the temperature, humidity, pressure, air or wind speed and/or direction, moisture content, fog level, and the like, and may include, without limitation, an inertial measurement unit (IMU), gyroscope, temperature sensor, proximity sensor, pressure sensor, light sensor, air speed sensor, and the like. Weather sensor may include, without limitation, an all-in-one weather sensor which is configured to measure multiple parameters, such as, and without limitation, wind speed and direction, precipitation, barometric pressure, temperature, relative humidity, and the like among other parameters. In some embodiments, at least a sensor includes a sensor external to aircraft and located at or connected to an external source. For example, and without limitation, weather sensor may be at a weather service, airport, airplane, local tower, connected to the internet, and the like. As used in this disclosure, a "weather datum" is a metric describing a state of weather, such as, without limitation, that of an environment exterior to an aircraft. For example, and without limitation, weather datum may include a temperature, humidity, pressure, air or wind speed and/or direction, moisture content, fog level, turbulence, and the like. Weather datum may also include historical data on the weather and future projections relating to the weather.

Still referring to FIG. 2A, in an embodiment, system 200 may include an air speed or wind sensor 244 configured to detect an air speed datum external to aircraft. Air speed sensor 244 may be on or onboard aircraft or remote from it. An "air speed sensor" as used in this disclosure is any sensor configured to detect, sense and/or measure an air speed datum in an environment exterior to aircraft. For example, and without limitation, an air speed datum may include wind speed and/or direction. Air speed or wind sensors may include, without limitation, anemometers, pitot tubes, hot-wire sensors, laser doppler sensors, ultrasonic sensors, pressure sensors, and the like among others. As used in this disclosure, an "air speed datum" is a metric describing a dynamic state of air in an environment exterior to an aircraft. For example, and without limitation, air speed datum may include wind velocity, wind speed, wind direction, vorticity, turbulence, and the like, among others. Air speed sensor 244 may provide or transmit air speed datum to flight controller 124. Plurality of flight data 216 may include air speed datum.

Still referring to FIG. 2A, in an embodiment, system 200 may include a terrain or landscape sensor 248 configured to detect the terrain and/or landscape below, around and/or external to aircraft. Terrain sensor 248 may provide or transmit terrain (or landscape) datum to flight controller 124. Plurality of flight data 216 may include terrain datum. As used in this disclosure, a "terrain sensor" is any sensor configured to detect, sense and/or measure a topographical feature external to aircraft. A "terrain datum" is information on a topographical feature external to aircraft. For example, and without limitation, a terrain datum may include detection of land or water below or around aircraft, type of land (e.g. desert, mountain, buildings, skyscrapers), obstacles around aircraft, and the like, among others.

With continued reference to FIG. 2A, in some embodiments, flight controller 124 may be configured to communicate (e.g. receive and/or transmit data and/or signals) with one or more sensors, including at least a sensor 224, weather sensor 240, air speed sensor 244, terrain sensor 248, and/or flight component(s) 108, including lift component(s) 112, pusher component(s) 116, battery pack(s) 228 including battery(ies) 232, and electric motor(s) 236. Flight controller 124, in an embodiment, may include any computing device and/or combination of computing devices programmed to operate aircraft. In an embodiment, flight controller 124 may be onboard aircraft. In another embodiment, flight controller 124 may be remote from aircraft. In an embodiment, flight controller 124 may include a proportional-integral-derivative (PID) controller. In some embodiments, one or more of the sensors as disclosed herein (or their equivalents) may be included in flight controller 124, as needed or desired.

Still referring to FIG. 2A, in an embodiment, flight component datum 252 and/or flight data 216 may include information on energy capacity of an energy source, for example, and without limitation, a metric relating to remaining energy of battery pack 228 and/or battery 232. In an embodiment, flight component datum 252 and/or flight data 216 may include an energy performance datum which may include information on state of charge (SOC) of a battery, for example, and without limitation, a metric relating to remaining charge of battery pack 228 and/or battery 232. In an embodiment, flight component datum 252 and/or flight data 216 may include a flight performance datum which may include information on torque of a propulsor, for example, and without limitation, a metric relating to torque and/or rotational speed (RPM) of a lift component 112 and/or pusher component 116.

Still referring to FIG. 2A, as used in this disclosure, "energy performance datum" is information on performance and/or operation of an energy source of an aircraft. Energy source may include, without limitation, a battery system, a battery module, a battery unit, a battery pack, a battery, an electrochemical cell or a battery cell, among others. For example, in some embodiments, energy source may include one or more battery packs 228 and/or battery(ies) 232 or battery cell(s). Energy performance datum may include, without limitation, battery performance datum such as, without limitation, an element of data including battery state of charge (SOC), battery capacity, battery output rate, battery life cycle, battery consumption rate, battery temperature, electrical integrity, ground fault, short circuit, battery ambient conditions, and the like, among others. Energy performance datum may include, without limitation, any metric relating to current and/or projected energy capacity of energy source, such as, without limitation an energy source including one or more batteries or batteries cells. Certain energy sources, battery packs, batteries and associated sensors to measure performance which may efficaciously be utilized in accordance with some embodiments are disclosed in U.S. Nonprovisional application Ser. No. 17/405,840, filed on Aug. 18, 2021, entitled "CONNECTOR AND METHODS OF USE FOR CHARGING AN ELECTRIC VEHICLE", the entirety of which is incorporated herein by reference.

Still referring to FIG. 2A, as used in this disclosure, a "flight performance datum" is information on performance and/or operation of an aircraft component that affects flight of an aircraft. For example, and without limitation, flight performance datum may include an element of data identifying and/or describing the parameters for a flight plan. Aircraft components may include, without limitation, any flight components 108 including, for example and without limitation, lift component(s) 112, pusher component(s) 116, and electric motor(s) 236. In some embodiments, aircraft components may include energy source components. Flight performance datum may include, without limitation, any metric relating to propulsor torque, propulsor rotational speed (RPM), motor efficiency, altitude, attitude, pitch, yaw, roll, intended flight plan, flight trajectory, predicted flight path, maximum flight path, minimum flight path, and the like, among others.

With continued reference to FIG. 2A, in an embodiment, flight data 216 may include a location datum. As used in this disclosure, a "location datum" is information on a spatial position of an aircraft. For example, and without limitation, location datum may include information on aircraft's attitude, altitude, latitude, longitude, and the like, among others. Location datum may include, without limitation, information on aircraft's relative location or position from a particular reference (e.g. a boundary, a building, a mountain, a lake, etc.). Location datum may include, without limitation, information on aircraft's location or position relative to one or more other aircrafts (or other moving objects) which may change over time based on movement of each aircraft.

Still referring to FIG. 2A, in an embodiment, flight data 216 may include an aircraft identity datum. As used in this disclosure, an "aircraft identity datum" is information on a specific feature of a particular aircraft. For example, and without limitation, aircraft identity datum may include information on type of aircraft (e.g. electric aircraft, eVTOL aircraft, hybrid-electric aircraft, jet engine aircraft, etc.), number of batteries onboard aircraft, payload of aircraft, cargo, number of passengers onboard, number of flight components, and the like, among others.

Still referring to FIG. 2A, in some embodiments, flight boundary 212 (and/or aircraft movement limit(s) 204) may be determined by using a machine-learning process, algorithm and/or model. This determination may include, without limitation, include training machine-learning process with training data correlating aircraft flight data, aircraft flight boundary data, and/or aircraft flight movement data, and generating flight boundary 212 and/or flight movement limit(s) 204 for aircraft as a function of machine-learning process and plurality of flight data 216. Machine-learning process may be implemented at or by flight controller 124 and/or one or more other computing devices, as needed or desired. Any of the machine learning processes, algorithms, and/or models as disclosed herein may be efficaciously used to determined flight boundary 212. Any of the training techniques and/or training data and/or sets of training data as disclosed herein may be efficaciously used to determined flight boundary 212. Certain embodiments of machine learning processes are discussed further herein. Training data may include, without limitation, aircraft flight data, aircraft flight boundary data and/or aircraft movement limit data. For reference, "flight data," "flight boundary," and "aircraft movement limit" have been defined above. Also, "machine-learning process" and "training data" are defined below with reference to FIG. 4. A plurality of data may be used to train machine-learning process such as, and without limitation, simulated data, data from other users, data from third-party companies, and any publicly accessible data. Training data may include data from past flights including, without limitation, behavior of aircraft that may have encountered and/or evinced various flight data patterns on past real flights. Such encounters may include, without limitation, failure and/or degradation of aircraft components in-flight, weather conditions (e.g. extreme rain, turbulence and/or lightning), and the like, among others. Training data, such as from past flights, may also be supplemented or replaced by, for example, updated and/or more accurate, data as might be input by users, pilots, fleet management agencies, aviation authorities, and the like, among others. Training data, such as from past flights, may also be supplemented or replaced by, for example, updated and/or more accurate, data from databases, other online and/or electronic sources, and the like.

Figure 2B:
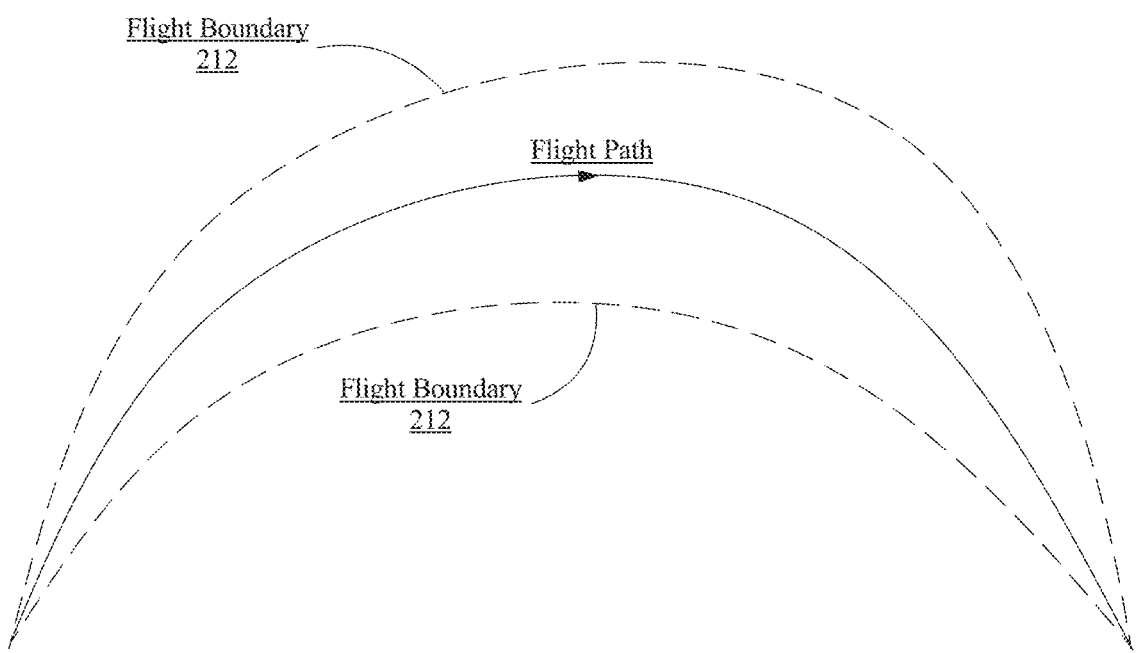
FIG. 2B is a schematic illustration of an exemplary embodiment of a flight boundary for an aircraft.

Referring now to FIG. 2B, an exemplary embodiment of a flight boundary for an aircraft is schematically illustrated. Flight boundary 212 may be determined or generated by any of the embodiments of system 200 as disclosed herein. An exemplary flight path (or trajectory) of an aircraft is also schematically shown in the drawing. Flight path may be an intended or actual flight path of aircraft.

Various embodiments as disclosed may provide a technique to set or otherwise adjust one or more aircraft movement limits. In some applications, without limitation, one or more of the technique(s) described herein may be used while pilots are learning how to fly a single-seat aircraft. With a single-seat aircraft, there may be no room in the aircraft for a flight instructor. Aircraft movement limits may enable an inexperienced pilot to safely learn how to fly single-seat aircraft, even if there is no flight instructor present in the aircraft and/or even if the pilot is not obeying the instructions of a flight instructor or other supervisor on the ground. In some embodiments, the training site may be an overwater training site and one or more aircraft movement limit(s) may be used to keep aircraft over the water for safety. In some embodiments, aircraft movement limit(s) (e.g., associated with an altitude limit and/or a velocity limit) may be adjusted by a flight instructor or other supervisor on the ground depending upon a novice pilot's progress and/or how safely a pilot may be flying. In some embodiments, an aircraft's state information (e.g., the aircraft's position with respect to something) may be continuously monitored and adjustments to an aircraft movement limit may be made dynamically and/or in real time in response to the aircraft's current state.

Embodiments as disclosed herein may be efficaciously used in conjunction with any aircraft. For example, and without limitation, single-seat aircraft, vertical takeoff and landing (VTOL) aircraft, multi-seat aircraft, conventional takeoff and landing (CTOL) aircraft, electric aircraft, hybrid-electric aircraft, and the like, among others. Also, a variety of techniques are described herein and these techniques may be used in any combination with each other, even if there is no example with that specific combination.

It is to be understood that in any of methods A, B, C, D, E, F and G, and associated examples, below, any of the embodiments of flight controller of the present disclosure may be used, alternatively or additionally, to a base station, flight instructor or supervisor, and/or computing device, to set aircraft movement limits (and/or associated values), generate control signals, determine flight boundaries, receive data, receive instructions and/or perform any other described computations, determinations and/or generations. These methods are for exemplary purposes only and are not limiting to the present disclosure. Moreover, flight boundary is not restricted to merely above a region, but may include any space as discussed above.

Method A represents an exemplary process which may be used to set an aircraft movement limit to some value where the aircraft movement limit is used to generate a control signal for an aircraft. In some embodiments, the process of method A may be used to control or otherwise constrain the flight of, without limitation, a single-seat aircraft. For example, a single-seat aircraft may not have space for a flight instructor when a new pilot is learning how to fly the aircraft. The process of method A may enable a new pilot to more safely learn how to fly aircraft, even if a flight instructor is not present in the aircraft (e.g., to provide guidance and/or intervene). This process of method A may be used even after some training session has ended (e.g., to protect pilots flying in some common airspace, such as over a recreational airspace over a lake). In some embodiments, any of the systems and/or controllers (for example, and without limitation system 100 and/flight controller 124) as disclosed herein, such as those of FIG. 2A, may be used to implement method A, or any of the other methods of the present disclosure.

At a step or first step of method A, a value for aircraft movement limit may be received, wherein the aircraft movement limit may be associated with a manned aircraft. The term aircraft movement limit is associated with some limit to the movement of an aircraft (for example, and without limitation, where a pilot's instructions will be obeyed only to the degree permitted by the aircraft movement limit, if any). The value which is received at this step may be obtained from a variety of sources. In some embodiments, the value may be specified and/or selected manually, for example, by a flight instructor or some other supervisor. In some embodiments, the value may be automatically determined, for example, by a controller or computing device. For example, and without limitation, depending upon some state information associated with aircraft (e.g., the aircraft's position relative to something, the aircraft's velocity, the aircraft's altitude, etc.), the value which is received at this step may be determined using a machine-learning process, function, lookup table, mapping, etc.

In some embodiments, aircraft movement limit may include a position limit associated with the aircraft, including (but not limited to) an attitude limit, an altitude limit, a latitude limit, and a longitude limit. In some embodiments, a position limit may be relative to some boundary (e.g., the aircraft's position should remain over a body of water or some smaller area within that body of water, and/or within a particular altitude range). In some embodiments, a position limit may be relative to some other aircraft (e.g., any two aircraft must remain a distance of "2r" apart, where "r" is the radius of some "bubble" around each aircraft).

In addition to or as an alternative to position limit as aircraft movement limit, in some embodiments, the aircraft movement limit may be a velocity limit. Some examples include a forward velocity limit, a lateral velocity limit, a rotational velocity limit (e.g., about a yaw or vertical axis), a vertical velocity limit, or a limit associated with a desired direction of movement (for example, and without limitation, indicated by an input device such as a joystick, and the like, among others). Other examples of aircraft movement limit may include a limit to some other rate associated with the aircraft, such as an attitude rate limit. In some embodiments, aircraft movement limit may include an acceleration limit.

At a next or another step of method A, aircraft movement limit may automatically be set to the value. By setting the aircraft movement automatically, a pilot may not be able to override the changing or setting of aircraft movement limit to a different, modified or new value. For example, if pilot is flying recklessly, a flight instructor or other supervisor may set velocity limit(s) of that aircraft to zero so that the aircraft is forced to come to a stop (i.e., hover mid-air). Being able to set aircraft movement limit to the value enables flight instructor or other supervisor to take control, even if pilot is uncooperative (one non-limiting example of how an aircraft movement limit may be used). Even with a cooperative pilot, being able to set aircraft movement limit automatically (e.g., without pilot permission) may be desirable because then pilot is not distracted by a request to set or otherwise update aircraft movement limit. In some embodiments, a controller or computing device may set aircraft movement limit.

At a next or another step of method A, a thrust envelope from pilot may be received. For example, in some embodiments, one or more of the techniques described herein may be performed by a single-seat, vertical takeoff and landing (VTOL) multi-copter or and eVTOL aircraft. This exemplary multi-copter may have two input devices via which thrust envelope can be received, which may include, for example, and without limitation, a joystick with a twistable knob at the tip of joystick (both of which may be spring centered) and a (e.g., up-down) thumbwheel which may also be spring centered. The two input devices may be placed or positioned so that one hand of the pilot (e.g., the right hand) may control joystick and the other hand (e.g., the left hand) may control thumbwheel. To takeoff or land (in this case, vertically), pilot may use the up-down thumbwheel to ascend or descend vertically, thus changing the altitude of multi-copter. To yaw (e.g., rotate about a vertical or yaw axis), twistable knob at tip or top of joystick may be used. To move in a horizontal plane at a given altitude, joystick (e.g., excluding the twistable knob) may be used. In the event all input devices are released (e.g., pilot lets go of thumbwheel and joystick, including twistable knob), multi-copter may be designed to come to a stop (e.g., if it was moving) and hover in-place, mid-air.

At a next or another step of method A, a control signal for aircraft may be generated using thrust envelope and aircraft movement limit. For example, with the exemplary multi-copter described above, there may be ten propulsors, rotors or propellers and control signal may be for one of the propulsors. Control signal may be based on thrust envelope, at least to a degree that the thrust envelope does not violate or exceed aircraft movement limit (e.g., which may have been set to some limit at an earlier step of method A).

In an exemplary scenario, a flight instructor or other supervisor, or controller (e.g. flight controller 124 of FIG. 2A), may observe that pilot is flying recklessly or is in distress. Flight instructor or supervisor, or controller such as flight controller 124, may set velocity limit(s) (one type of aircraft movement limit, among others) of the relevant aircraft to zero. With velocity limit(s) set to zero, even if pilot moves joystick or thumbwheel, generated control signal(s), for example in accordance with method A or any of the other methods as disclosed herein, will correspond to a "hover in-place" value as opposed to a "move" value. Thrust envelope to move at a non-zero velocity will be ignored or overridden since it is in violation of velocity limit(s) which is/are currently set to zero.

In some embodiments, aircraft movement limit may have an initial or default value which may be loaded or otherwise set when aircraft is started. For example, the process of method A may be used to update aircraft movement limit throughout flight (e.g., depending upon the instructions from flight instructor or other supervisor, or controller such as flight controller 124 of FIG. 2A, new values for aircraft movement limit may be automatically determined based on current state information, etc.). Stated differently, the process of method A may be continuously performed during a flight to allow aircraft movement limit to be continuously or periodically updated, as needed or desired.

In an exemplary embodiment, aircraft may include, without limitation a floatable multi-copter with floats which permit the multi-copter to take off and land on water. Multi-copter may be constrained to fly over water using, for example, position limit(s) in accordance with embodiments of the present disclosure. In this exemplary embodiment, multi-copter may be a single-seat, VTOL multi-copter. Multi-copter may be an electric multi-copter, a hybrid-electric multi-copter, or a fuel-powered multi-copter. Multi-copter may include, without limitation, two floats which permit multi-copter to take off and land on water, if desired or as needed. This exemplary multi-copter may be designed to be easy to fly so that inexperienced pilots (e.g., without a pilot's license) can quickly learn how to fly it without having to undergo long hours of flight training. For safety reasons, training of new pilots may be envisioned to occur over water because crashing or having a hard landing on water is relatively safer than on land. To further ensure safety of new pilots as they learn how to fly a multi-copter, any of the techniques in accordance with embodiments disclosed in the present disclosure may be used to make the learning experience even safer.

In some embodiments, position limit (a type of aircraft movement limit, among others) may be set to some value that corresponds to "over water." For example, values received in accordance with method A, or any of the other embodiments as disclosed herein, may correspond to permitted over-water locations (e.g., one or more latitude and longitude pairs which correspond to permitted positions over water, a "stay over water" bit may be set to TRUE or FALSE, etc.). In some embodiments, these values may have some buffer or margin between the shoreline and the permitted positions.

In some embodiments, to ensure the safety of new pilots, there may be some limit on floatable multi-copter's velocity and position in overwater training sessions. In one example, floatable multi-copters may be constrained to have: a position limit (e.g., must stay over water, cannot go higher than an altitude limit, must stay a minimum distance away from other multi-copters/pilots, etc.), a velocity limit (e.g., in any direction or along any axis of rotation), an attitude rate limit (e.g., so the pilots cannot go nose-up or nose-down too quickly), etc.

In some embodiments, generation of control signal, for example, in accordance with method A or any of the other embodiments as disclosed herein, in the context of the floatable multi-copter example (i.e., multi-copter is limited to be over water) may be position-based and/or sensor-based. For example, with a sensor-based approach, there may be sensors mounted to, for example, and without limitation, a fuselage or lower surface of multi-copter which (e.g., based on the returned signal) may be able differentiate between water and land. Or, with a position-based approach, aircraft may communicate with a global positioning system (GPS) satellite, or the like, in order to determine its position (e.g., latitude and longitude). Given its position, in combination with some database and/or map of bodies of water and their location(s), it can be determined whether multi-copter is over land or water. Any of the suitable sensors as disclosed herein may be efficaciously utilized in this sensor-based approach.

The capability, in accordance with some embodiment, to configure aircraft movement limit so that aircraft is limited to remain over water may permit a variety of flight modes which can be turned on or off, as desired or needed. For example, and without limitation, floatable multi-copter may also take off and land on land. In one example usage scenario, on weekends, floatable multi-copter may be brought to a body of water and may be flown over a body of water. During this time, for safety, aircraft movement limit (s) may be set so that aircraft is limited to fly over water. At the end of the day, floatable multi-copter may be brought back home where the multi-copter may be used as a personal transportation device to fly between a home and an office during weekdays. This flight path may go over land and for this type of flight path aircraft movement limit may be (re)set so that multi-copter is permitted to fly over land.

The above floatable multi-copter example illustrating use of a position limit to influence a multi-copter to fly over water may, in accordance with some embodiments, be described by method B. In an embodiment, method B provides a process to set a position limit so that an aircraft remains over water. Method B may be considered a modified version of method A with modified steps, and as such certain details discussed in conjunction with method A above are not repeated. In various embodiments, the process of method B may be initiated by a pilot (e.g., so that the pilot can put an aircraft into this mode even if they are by themselves), a flight instructor or other supervisor (e.g., getting aircraft ready for a training session), or by a base station near a body of water (e.g., which may automatically detect aircrafts in the vicinity of the body of water and automatically initiates the process shown here) and/or by a controller such as flight controller 124 of FIG. 2A. Base station may include, without limitation, an air traffic control (ATC) facility, an airport, a landing strip, pad or deck, a recharging station, a refueling station, a fleet management facility, a weather station, and the like, among others. Base station may be, without limitation, equipped with and/or communicatively connected to a controller, such as flight controller 124 of FIG. 2A.

At a step or first step of method B, a value for aircraft movement limit may be received, wherein aircraft movement limit may be associated with a manned aircraft pilot and aircraft movement limit may include a position limit, among others. For example, position limit may include limits on aircraft's permitted latitude and/or longitude (e.g., so that aircraft remains over water which may be safer than flying over land). In some embodiments, the value may be for or associated with some part of body of water so that aircraft may remain over a subsection of body of water instead of being able to roam over the entire body of water.

At a next or another step of method B, aircraft movement limit may be automatically set to the value, wherein the value is associated with body of water. In one example, before a training session or lesson, a flight instructor may fly aircraft from land, and land on body of water. Aircraft movement limit may then be set at this step.

At a next or another step of method B, a thrust envelope may be received from a pilot. For example, thrust envelope may push a joystick forward and hold it, causing an exemplary multi-copter, or other suitable aircraft as disclosed herein, to fly forward and approach the shoreline of body of water.

At a next or another step of method B, a control signal for aircraft may be generated using thrust envelope and aircraft movement limit, wherein control signal may constrain aircraft to stay above body of water. For example, as an exemplary multi-copter, or other suitable aircraft as disclosed herein, approaches the shoreline, control signal (e.g., directed to one of the propulsors, rotors, or the like) may transition from a "fly forward" value to a "hover in place" value so that multi-copter, or other aircraft, does not cross some imaginary boundary (e.g., at or near the shoreline). In some embodiments, aircraft may be constrained to remain over some region of the body of water (e.g., as opposed to being able to range over the entire body of water). For example, and without limitation, if there are two or more aircraft flying over the body of water, in some embodiments, the aircrafts may be confined or otherwise constrained to different regions of the body of water.

As also noted above and herein, at least some of the techniques disclosed herein may be used to ensure the safety of pilots learning how to fly. In some embodiments, a base station may be used to adjust the value of aircraft movement limit (e.g., during a training session of new pilots, or even after a training session by a lifeguard or monitor of a shared recreational body of water). In such embodiments, base station may be capable of changing the value of aircraft movement limit in a selected aircraft. For example, multiple pilots may be learning how to fly a multi-copter, or other aircraft. To mitigate damage in the event of a hard landing or crash, multi-copters (or other aircrafts) may be compelled to fly over a body of water, for example, using some of the techniques described above and herein. In this example, there may be a flight instructor or supervisor on the ground at this overwater training site. Flight instructor may have access to a base station which can selectively adjust aircraft movement limit on a selected multi-copter, or other aircraft, as or if needed. In some embodiments, a flight controller (e.g. flight controller 124 of FIG. 2A) may be used to adjust the value of aircraft movement limit.

For example, the pilot of a first multi-copter MC1, or other aircraft, may be flying in a safe and responsible manner. The pilot of a second multi-copter MC2, or other aircraft, may be flying too fast and/or recklessly. To slow second multi-copter down, one or more velocity limits (a type of aircraft movement limit, among others) for MC2 may be decreased using base station to provide instruction. In some instances, and without limitation, using base station, flight instructor, controller, or computing device may identify MC2 as the multi-copter to which instruction is directed and specify one or more new velocity limits. In some embodiments, predefined limits (for example, and without limitation, multiples of five or ten) and/or qualitative suggestions (e.g., slow down a little, slow down a lot, stop, etc.) may be offered by base station. Base station may then generate an instruction and broadcast it over, for example and without limitation, a wireless channel so that it may be received by both MC1 and MC2. In such an example, among other embodiments, instruction may include an identification of the multi-copter, or other aircraft, to which the instruction is directed (in this case, MC2). With this "To" field, first multi-copter MC1 would have knowledge that instruction is not directed to it and ignore or overlook the instruction. Second multi-copter MC2 would be able to see its identifier in the "To" field and make the changes specified by instruction.

In some embodiments, each aircraft, for example first and second multi-copter, may manage multiple aircraft movement limits. Since not all aircraft movement limits may necessarily be set by a given instruction, in some embodiments, an instruction may identify which aircraft movement limit(s) are being set or otherwise updated by this particular instruction. For example, and without limitation, all velocity limits may be set or otherwise updated by an instruction. Instruction may also include, without limitation, new values for those specified limits which instruction may set, for example and without limitation, all velocity limits to a new value.

Some examples of various aircraft movement limits include, without limitation, an altitude limit (e.g., above which aircraft is not permitted to fly) as well as one or more velocity limits (e.g., associated with movement relative to various directions, planes, axes, etc.) where aircraft is not permitted to fly faster than the limit (e.g., relative to the associated direction, plane, axis, etc.). For example, there may be a vertical velocity limit (e.g., how fast aircraft can ascend or descend along a vertical axis), a forward flight velocity limit (e.g., for flight within some lateral plane at a given altitude), a yaw rate limit (e.g., how fast aircraft is permitted to rotate about a yaw or vertical axis), as well as a pitch rate limit (e.g., how fast aircraft is permitted to pitch nose-up or nose-down about a pitch axis), etc. The latter two limits may more generally be referred to as rotational rate limits.

In an extreme example, velocity limit(s) of aircraft, such as second multi-copter MC2 above, may be reduced to zero, such that the multi-copter, or other aircraft, comes to a stop, hovering mid-air. In some embodiments, if desired, base station may be used to manually land the halted multi-copter (or other aircraft) or initiate an autonomous landing sequence from some base station (e.g., managed by an on-the-ground flight instructor, other supervisor, controller such as flight controller 124 of FIG. 2A, or computing device). As with the instruction to change the velocity limit(s), such an instruction may be sent wirelessly and may include some unique aircraft identifier so that the appropriate aircraft lands and the other aircraft are not compelled or forced to land.

Alternatively, if a pilot is demonstrating progress and is flying in a responsible manner, one or more aircraft movement limits may be increased. For example, since pilot of first aircraft MC1 (as discussed above) has been flying safely on current settings, one or more aircraft movement limits, such as a velocity limit and/or an altitude limit, may be increased, as needed or desired.

In various embodiments, base station features and/or operation may be implemented in a variety of ways, for example, and without limitation, depending upon facilities available at the site, such as an overwater training site. For example, if there is no power source, base station may be a battery-powered, hand-held, and/or portable base station. Alternatively, if an AC power source is available, then the base station may operate off an AC power supply and be more permanent and/or larger. Any appropriate wireless communication channel may efficaciously be used, such as and without limitation, satellite communication, mobile network communication, radio communication, and the like, among others. In some embodiment, flight controller 124 (see FIG. 2A) may efficaciously be provided at base station or may communicate with base station, as needed or desired.

In some embodiments, a process to set an aircraft movement limit using a base station may be exemplified by method C. Steps of the process of method C, in some embodiments, may efficaciously be used in conjunction with methods A and B, as well as other embodiments of the present disclosure.

At a step or first step of method C, an instruction to set aircraft movement limit may be received from a base station, wherein the instruction may include an aircraft identifier and a specified value for aircraft movement limit. For example, instruction may include an aircraft identifier, such as for second aircraft as "MC2", and a new value for one or more velocity limit(s), for example and without limitation, as "5 mph." In some embodiments, this is how a value for aircraft movement limit may be received at a suitable step in method A, such as a first step.

At a next or another step of method C, it may be decided whether to obey instruction, including by determining if aircraft identifier matches an identifier associated with the aircraft. For example, first aircraft MC1 could ignore instruction but second aircraft MC2 could perform the instruction to decrease velocity limit(s). In some embodiments, the decision at this step may include verification and/or security processes to prevent a malicious and/or unauthorized user from changing aircraft movement limit.

At a next or another step of method C, in response to deciding to obey the instruction, aircraft movement limit may automatically be set to the specified value. For example, and without limitation, instruction may include an aircraft identifier associated with second aircraft MC2 and so MC2 would make the change or update to the specified aircraft movement limit specified by instruction. In some embodiments, setting aircraft movement limit to a value at a step (e.g. second step) may include these last above two steps of method C.

Conversely, if it is decided not to obey instruction, then aircraft movement limit(s) is/are not changed. For example, as discussed above, an instruction to change an aircraft movement limit may be directed to second aircraft MC2, and not first aircraft MC1, and so the latter aircraft could ignore the instruction, keeping its aircraft movement limit unchanged.

In some exemplary embodiments, geofencing may be provided wherein a body of water may be divided into two (or more) regions with the arrival of a second aircraft or multi-copter such as MC2 in addition to an already present aircraft or multi-copter such as MC1. In such an example, each region or zone may have at most one aircraft to prevent collisions.

For example, a single or first aircraft MC1 may be flying over a lake. When only one aircraft (such as first aircraft MC1) is present, that aircraft may be permitted to fly or otherwise roam over all parts of lake. In other words, there may be no part of lake that is off limits to aircraft MC1, at least in the current state or time. Now, a second aircraft (such as second aircraft MC2) may arrive at lake so that there are now two aircraft (such as MC1 and MC2) at the lake. To prevent a collision between the two aircraft, lake may be divided in half to create or otherwise define two regions, such as a first region and a second region. MC1 may only be permitted to fly over first region and cannot fly in second region. Similarly, MC2 may only be permitted to fly over second region and may not be permitted to fly over first region. This description is one example, without limitation, of how geofencing may be implemented.

In some embodiments, base station may perform a number of functions or operations to support geofencing or division of lake, such as described above. For example, each of the two aircraft (such as MC1 and MC2) may broadcast information over a wireless channel, or the like, which may permit base station to know how many aircrafts are flying over lake. For example, each aircraft may broadcast its aircraft identifier (at least) which may permit base station to subsequently direct instructions (e.g., to change an aircraft movement limit) to a particular aircraft. This information broadcast by aircraft may also permit base station to detect when there is a change from a single aircraft over a body of water, such as a lake, to when two or more aircrafts are present over body of water, such as the lake. Once base station detects an increase in the number of aircrafts from one to two or more, base station may set appropriate aircraft movement limits in each aircraft, for example aircrafts MC1 and MC2, so that they fly over respective regions, such as first and second regions for aircrafts MC1 and MC2 respectively. In some embodiments, base station may store a variety of floorplans for various numbers of aircrafts so that there are predefined regions readily available. For example, base station may have a floorplan for two aircrafts (e.g., with two predefined regions), a floorplan for three aircrafts (e.g., with three predefined regions), etc. In some embodiments, flight controller 124 (see, e.g., FIG. 2A) may perform a number of functions or operations to support geofencing or division of a particular region.

In some embodiments, base station (and/or flight controller 124) may perform operations or functions to more smoothly and/or safely switch from n regions to (n+1) regions or vice versa. For example, it may be safer to have all of the aircrafts come to a stop when changing the number and/or location of the regions. Base station may issue instructions to set appropriate aircraft movement limits, bringing all of the aircrafts to a stop. Base station may then issue a second round or set of instructions to the stopped aircrafts to update the appropriate aircraft movement limits with the new regions. Base station may then issue a third round or set of instructions to update the appropriate aircraft movement limits so that the aircrafts can again move (e.g., within the new region allocated to that particular aircraft).

To more quickly and/or safely switch from geofencing for a single aircraft, such as for MC1 over a lake, to that for two aircrafts, such as MC1 and MC2 over the lake, as discussed above, in some embodiments, base station (and/or flight controller 124) may be used to escort or nudge an aircraft to a different part of the lake if its current position is not within its new region. For example, suppose that MC1 had been in second region when the switch from a single region to two regions was about to be performed. In some embodiments, a flight instructor, a controller, or a computing device may use the base station to take over the controls of MC1 and fly MC1 from second region to first region to more quickly make the switch. Alternatively, in some embodiments, base station may be used to initiate some autonomous (e.g. using a controller, computing device, or the like) flight of MC1 from second region to first region. In contrast, if a novice pilot had to fly out of second region to first region on their own so that the two-region floorplan could be obeyed, it might take longer, be more stressful for a pilot, and/or increase the likelihood of a collision.

Similarly, base station (and/or flight controller 124) may detect when the number of aircrafts flying over lake decreases, for example, because someone is done flying. For brevity, associated operations are not described herein, but operations and/or processes (similar to those described above) may be performed to make the switch from (n+1) regions to n regions easier, faster, and/or safer. In some embodiments, base station may perform any of these operations or functions (as discussed herein including above) autonomously or otherwise automatically (e.g., without requiring the intervention of a flight instructor or supervisor on the ground) by utilizing, for example and without limitation, a controller, computing device, or the like. For instance, this could enable a family or group of friends to fly together over a body of water without having to have someone man base station. People could come and go throughout the day and the different regions (e.g., enforced through the appropriate setting of the appropriate aircraft movement limit(s)) would be updated automatically.

In some embodiments, a process to perform geofencing using regions over a body of water may be exemplified by method D. For example, the process of method D may be performed by a base station (and/or flight controller 124), such as the above described base station and first aircraft MC1 and second aircraft MC2 over a lake. In the context of method A, the value received at a step, such as first step, for a given aircraft movement limit (e.g., used to enforce the new boundaries of the new floorplan) may be received from base station and the base station may perform this process, in accordance with method D, in order to determine or otherwise generate that value.

At a step or first step of method D, a plurality of aircraft may be counted in order to obtain a number of aircraft. For example, base station may count two or more aircrafts, such as and without limitation, first aircraft MC1 and second aircraft MC2.

At a next or another step of method D, a floorplan corresponding to the number of aircraft may be selected from a plurality of floorplans, wherein the floorplan may include a separate region over a body of water for each aircraft in the plurality of aircraft to fly over. For example, and without limitation, base station may store a floorplan with two regions for when there are two aircrafts, a floorplan with three regions for when there are three aircrafts, and so on. For the example with two aircraft MC1 and MC2 over a lake, the floorplan for two aircrafts would be selected (e.g., where the lake may be divided down the middle).

At another or next step of method D, each aircraft in the plurality of aircraft may be assigned to one of the regions in the floorplan. For example, in the context of two aircrafts, first aircraft MC1 may be assigned to first region and second aircraft MC2 may be assigned to second region. Depending upon the assigned region, base station may update the appropriate aircraft movement limits. For example, and without limitation, base station may send an instruction to update one or more location limits in MC1 to value(s) that correspond to first region. Similarly, and without limitation, base station could update appropriate location limit(s) in MC2 to value(s) that correspond to second region.

This process, and/or steps, of method D may be repeatedly performed so that as the number of aircraft changes (e.g., some aircraft begin flying and others end their flight), the appropriate floorplan and/or number of regions may be used.

In various exemplary embodiments, the state of aircraft (e.g., a distance from the aircraft, the aircraft's velocity, the aircraft's altitude, etc.) may be used to select an appropriate value for aircraft movement limit. This is further described below by way of a more general process followed by more specific examples which can illustrate different applications or usage scenarios.

In some embodiments, a process to set an aircraft movement limit by using a value which is selected based at least in part on state information associated with aircraft may be exemplified by method E. At a step or first step of method E, a value for an aircraft movement limit may be received, wherein aircraft movement limit is associated with a manned aircraft and the value is determined based at least in part on state information associated with aircraft. For example, as described in more detail below, in various embodiments, state information may relate to a distance from aircraft (e.g., along a desired direction of movement), an (absolute) altitude of aircraft, or a (forward) velocity of aircraft. Depending upon the state of aircraft, appropriate values for certain aircraft movement limits may be set automatically (e.g., by controller, such as flight controller 124 of FIG. 2A, computer, computing device, and the like, and/or without intervention by a flight instructor or supervisor on the ground).

At another or next step of method E, aircraft movement limit may be automatically set to the value. For example, in some cases, aircraft movement limit may be a velocity limit along a desired direction of movement which may be used to perform geofencing. In some embodiments, aircraft movement limit may be a velocity limit and may be used to slow down aircraft which are flying low to the ground. In some embodiments, aircraft movement limit may include an attitude limit which may be used to reduce stress on certain types of aircrafts which have certain structural configurations and/or vulnerabilities.

At another or next step of method E, a thrust envelope may be received from a pilot. At another or next step of method E, a control signal may be generated for aircraft using thrust envelope and aircraft movement limit. In some embodiments (e.g., where a velocity limit is used to enforce a geofence), any thrust envelope to fly beyond a boundary would be countermanded by limiting a desired velocity per the velocity limit. Or, if a low flying aircraft tries to fly faster than a velocity limit's current value, the "too fast" desired velocity would be reduced in order to comply with the velocity limit. Or, if an aircraft is flying forward too fast and tries to go nose-up or nose-down too much at the same time (which could stress the airframe), the attitude limit would act to limit the desired attitude, thus reducing the stress on the airframe.

A more specific example of method E may include a geofencing example wherein an aircraft should or must remain over a body of water. Such an example may include, in an embodiment, a velocity limit which may be set based on a distance along a desired direction of movement to a shoreline. For instance, one or more velocity limits (a type of aircraft movement limit, among others) may be used to enforce a geofence which includes a shoreline. In other words, aircraft may be constrained to fly over water over some part of body of water or (alternatively) the entire body of water. To ensure that aircraft does not fly past shoreline (e.g., because of some drift or error due to sensor noise, wind, etc.), velocity limit may be decreased (e.g., automatically using a controller, computing device, or the like) as the distance (measured along some desired direction of movement) gets closer to shoreline (or, more generally, some border or geofence). Although a shoreline is used in this example as a geofence boundary, it is noted that this technique applies more generally to any type of geofence boundary, not just a shoreline. In various embodiments, and without limitation, using a velocity limit to enforce a geofence may be used alone or in combination with using a position limit, or other type of aircraft movement limit, to enforce a geofence, as needed or desired. A desired direction of movement may be indicated using some input device, such as, and without limitation, a joystick. For example, suppose pilot pushed joystick forward so that the desired direction of movement is forward. The distance between aircraft and shoreline (900) along the forward desired direction of movement may be calculated and (generally speaking) as that distance decreases, the velocity limit in that direction (in this case, the forward direction) would similarly decrease until it reaches zero.

A graph may be utilized to illustrate embodiments of velocity limits which may be adjusted based on a distance along a desired direction of movement to a shoreline. For example, and without limitation, the x-axis may represent the distance to shoreline along some desired direction of movement and the y-axis may represent velocity (e.g., along the desired direction of movement). For instance, when aircraft is relatively far from shoreline (e.g. distance D1 or greater), velocity limit (e.g., which may be set and/or adjusted per this technique) may be set a relatively high default and/or global value. If a horizontal line represents this, the area beneath this line would show the relevant permitted velocities. Thus, at distances of D1 or greater (e.g., to the shoreline along the desired direction of movement), velocity limit (again, along the relevant desired direction of movement) may be set to some global and/or default value. If aircraft gets closer to shoreline (e.g. distance less than D1 and greater than or equal to D2), velocity limit may be reduced to less than default and/or global value (e.g. velocity limit V1) for distances between D2 and D1 to the shoreline. Again, this could be represented by another horizontal line on graph with the area beneath this line showing the relevant permitted velocities. If aircraft gets even closer to the shoreline (e.g. distance less than D2 and greater than or equal to D3), velocity limit may be further reduced (e.g. to velocity limit V2) for distances between D3 and D2 to the shoreline. Again, this could be represented by another horizontal line on graph with the area beneath this line showing the relevant permitted velocities. Finally, at distances between 0 (zero) and D3 to shoreline, velocity limit may be reduced to zero. For example, even if pilot of an aircraft is in this range and is pushing joystick (or the like) forward, the aircraft will not fly forward because the forward velocity limit has been set to zero. As described above, this keeps aircraft over a body or region of water (e.g. lake or region of lake), even if there is some wind gust and/or sensor noise which might otherwise inadvertently cause the aircraft to cross the shoreline boundary.

It should be noted, in accordance with some embodiments, that velocity limit of zero (in region 0-D3) is specific for a current or given desired direction of movement (in this case, forward) and other desired directions of movement may have non-zero velocity limits which would permit aircraft to fly in those directions. For example, suppose that an aircraft had continued to fly forward so that it was within region the 0-D3 region with respect to forward direction of movement. Although the limit on forward direction of movement is set to zero, other directions of movement may have non-zero velocity limits. For example, and without limitation, along a lateral desired direction of movement assume that the distance to the shoreline is greater than D1 such that the velocity limit along lateral direction is set to some global and/or default value so that the pilot can fly laterally (i.e., sideways, parallel to the shoreline) up to the default and/or global velocity limit, if and as desired.

Some types of movement supported by an exemplary aircraft may not change the effective distance to the shoreline and therefore may not be set or otherwise adjusted per the above-described technique. For example, exemplary aircraft may rotate about a vertical (yaw) axis of rotation. Such a rotation would not change the position of aircraft relative to shoreline and therefore any limit related to rotating about a vertical (yaw) axis of rotation may not be adjusted or otherwise set in the manner described here. Similarly, if so instructed by pilot, exemplary aircraft may ascend or descend along the vertical (yaw) axis without any front-to-back or side-to-side (lateral) movement. This up-down type of movement also would not effectively move aircraft any closer to or further away from the shoreline and therefore a velocity limit in the vertical direction is not limited per the technique described here.

In accordance with some embodiments, by setting or otherwise adjusting velocity limits in this more nuanced manner (e.g., instead of enforcing the same limit for all velocities in all directions), aircraft may be forced to slow down in those directions which would bring it closer to the shoreline (or, more generally, the geofence boundary) while not necessarily limiting the velocity in other directions (e.g., which would move the aircraft further away from the shoreline or which would not effectively change the distance of the aircraft to the shoreline (e.g., rotation)). Thus, even if aircraft flies up to shoreline and it is "touching" the shoreline, it can still fly away, for example, by rotating around a vertical (yaw) axis to face the center of the body of water and subsequently flying away from the shoreline, or by flying backwards away from the shoreline (e.g., without first rotating to face the center of the body of water).

In one exemplary embodiment of how this example fits with method E, aircraft movement limit (e.g., referred to in a step or first step of method E) may include a velocity limit and the value may be determined based at least in part on state information associated with aircraft (see, e.g., a step or first step of method E), which may include determining a distance along a desired direction of movement from aircraft to a boundary (where the state information associated with aircraft may include the distance) and determining the value for velocity limit based at least in part on the distance where a first, lower value is determined for the velocity limit based at least in part on a first, closer distance (e.g., region 0-D3 discussed above) and a second, higher value is determined for the velocity limit based at least in part on a second, further distance (e.g., region D3-D2 discussed above).

In some embodiments, limits on deceleration (or, more generally, acceleration) or other limits may ensure that any limiting of a desired velocity (e.g., specified or requested by pilot) per the appropriate velocity limit does not induce a sudden deceleration or other undesirable effect (e.g., when generating a control signal (e.g. at third step of method E) which enforces a velocity limit set using this technique). Stated differently, in some embodiments, any enforcement of a velocity limit may be balanced with enforcement of one or more other limits (e.g., on deceleration) to produce a desirable flight experience (e.g., so long as in the long run velocity limit is eventually obeyed).

In some embodiments, a similar technique of adjusting or otherwise setting velocity limits may be used to enforce a nucleoid (e.g., bubble-like) type of geofence. In an exemplary embodiment, velocity limits may be adjusted in order to enforce a nucleoid type of geofence. In this example, a bird's eye view may be envisioned of a first aircraft and a second aircraft wherein the two aircrafts are facing each other. To prevent collisions, each aircraft may have a conceptual or virtual "bubble" around it, such as a first bubble surrounding first aircraft and a second bubble surrounding second aircraft. As each aircraft moves about, the corresponding bubble also moves so that the aircraft is always at the center of the conceptual or virtual bubble (e.g., the aircraft may be envisioned to be like a nucleus with the bubble surrounding it).

In such a nucleoid geofencing example, aircrafts should remain, for example and without limitation, at least "2r" apart from each other where "r" is the radius of the bubbles. In other words, bubbles may touch, but they cannot overlap. In an exemplary state, first and second bubbles may be touching but not overlapping. In this situation, forward velocity limits of two aircrafts may be set to zero because moving forward would cause the two bubbles to overlap (i.e., be closer than the permitted distance of "2r") and therefore the two aircrafts are not permitted to fly forwards. A range of permitted and non-permitted directions of movements for each aircraft may be mapped (for example, in 2-D or 3-D space). Non-permitted directions of movements would bring the aircrafts closer to each other, that is, the bubbles would overlap. Within this range of non-permitted directions of movement, the velocity limits in those directions may be set to zero so that the bubbles do not overlap. However, if either pilot wished to fly their aircraft sideways (e.g., along lateral desired directions of movement), this could increase the distance between the two aircrafts and therefore there may be no adjustment (e.g., no reduction) to a lateral velocity limit. Stated differently, there may be a non-zero (i.e., higher) velocity limit for lateral direction(s) compared to forward direction(s). For example, lateral direction may not fall within the mapped space (which represents the range of movement directions which would cause the two aircrafts to move closer to each other).

In an exemplary embodiment, of how the above example may fit into method E, aircraft movement limit (see, e.g., a step or first step of method E) may include a velocity limit and the value is determined based at least in part on state information associated with aircraft (see, e.g., a step or first step of method E), which may include determining whether a desired direction of movement would move aircraft closer to or further away from a second aircraft. The desired direction of movement may be a type of state information associated with aircraft because (as an example) the desired direction of movement may be received from, without limitation, a joystick, or the like, associated with aircraft and therefore the desired direction of movement would correspond to a state (e.g., pushed direction) of the joystick. In response to determining that desired direction of movement would move aircraft closer to second aircraft, a first, lower value may be selected or otherwise determined for velocity limit (e.g., a velocity limit of zero may be selected for forward direction of second aircraft); in response to determining that the desired direction of movement would move aircraft further away from the second aircraft, a second, higher value may be selected or otherwise determined for velocity limit (e.g., a non-zero velocity limit may be selected for lateral direction of second aircraft).

As described herein, including above, other types of movement and/or rotation which increase or maintain the distance between two aircrafts are not necessarily restricted in this manner. For example, a diagonal (e.g., forward-left or forward-right) movement may be permitted, so long as the two bubbles (discussed above) do not overlap and the distance between the two aircrafts stays the same or increases. This may, for example, permit the two aircrafts to "slide" by each other. Or, one of the aircrafts may rotate to face in another direction (i.e., away from the other aircraft) and fly away.

In some embodiments, in addition to the desired direction of movement (and whether that would bring the two aircrafts closer to each other), the value for the velocity limit may also be determined based on the current distance between aircrafts. For example, pilots may find it annoying, counterintuitive, and/or inexplicable to have velocity limits drop when another aircraft is relatively far away. It may be more intuitive and useful if velocity limits were only reduced when two aircrafts are sufficiently close to each other. For example, the following table may be used.

TABLE 1

Example Velocity Limit (s) Based on Current Distance and Desired Direction of Movement

| Current Distance Between Aircrafts is Between | Desired Direction of Movement | Velocity Limit (s) |
|---|---|---|
| 0-10 feet | Decreases Distance Between Aircrafts | Set to 0 (zero) |
| 0-10 feet | Increases Distance Between Aircrafts | Set to 3 MPH |
| 10 feet or more | N/A | Set to Default/Global |

In an exemplary embodiment, of how this may fit into method E, aircraft movement limit (see, e.g., a step or first step of method E) may include a velocity limit and the value may be determined based at least in part on state information associated with aircraft (see, e.g., a step or first step of method E), which may include determining whether a desired direction of movement would move aircraft closer to or further away from a second aircraft, determining a distance between aircraft and second aircraft, and comparing the distance to a distance threshold. If (1) the desired direction of movement would move aircraft closer to second aircraft and (2) the distance does not exceed the distance threshold, a first, lower value may be selected or otherwise determined for velocity limit (see, e.g., the first row in Table 1). If (1) the desired direction of movement would move aircraft further away from second aircraft and (2) the distance does not exceed the distance threshold, a second, higher value may be selected or otherwise determined for velocity limit (see, e.g., the second row in Table 1).

A variety of techniques may efficaciously be utilized to calculate distances between aircrafts. In one example, and without limitation, each aircraft may continuously broadcast its position (e.g., over a wireless channel, or the like, among others). Each aircraft may listen for the positions of other aircrafts in its vicinity and continuously calculate distances, as needed or desired.

In some embodiments, some of this distance calculation may performed by a base station to conserve power and/or processing resources on the aircrafts. For example, and without limitation, each aircraft may broadcast its position (e.g., latitude, longitude, altitude, and the like) over a wireless channel, or the like. Base station (and/or flight controller 124) may receive these positions, monitor relative distances between aircrafts, and adjust velocity limits accordingly from base station. For example, and without limitation, base station may send an instruction to a specified aircraft in order to set aircraft movement limit(s) on, for example, second aircraft MC2 but not on first aircraft MC1 (which are also discussed above). Alternatively, each aircraft may track distances and set velocity limits accordingly on its own, as needed or desired.

In some embodiments, all of the aircraft may be treated like (point) charges with the same sign (e.g., a positive point charge or a negative point charge) and aircraft movement limit may be set in a manner that models the repulsive force between two charges of the same sign. In an exemplary embodiment, a modeled repulsive force may be a type of aircraft movement limit to enforce a geofence. For example, and without limitations first and second aircrafts may both be (e.g., conceptually) associated with the same charge (for example, a negative point charge). To prevent the two aircrafts from colliding with each other and/or enforce a geofence, a type of aircraft movement limit referred to herein as a modeled repulsive force may be set. The value of this modeled repulsive force may be determined based on the distance between first and second aircrafts such that the modeled repulsive force increases as the two aircrafts get closer to each other. This is sometimes referred to as a repulsive potential field model. In one example, and without limitation, per Coulomb's Law, the repulsive force between two point charges of the same sign (and ignoring the magnitude of the charge) varies inversely with the square of the distance between the two.

When control signal is generated for aircraft (see, e.g., at a fourth step of method A), the modeled repulsive force may be used to model a repulsion between first aircraft and second aircraft. Naturally, as the two aircrafts get closer to each other, the value of the modeled repulsive force would increase and the modeled repulsion will be more pronounced and/or noticeable.

In one example, and without limitation suppose that pilot of first aircraft (e.g., MC1) may be pushing his/her joystick forwards so that first aircraft flies towards second aircraft (e.g., MC2) (without limitation, the two aircrafts are facing each other in this example). Suppose the two aircrafts get relatively close to each other and then the pilot lets go of his/her joystick so that the joystick goes into a centered and/or neutral position. Normally, releasing the joystick like this may cause an aircraft to come to a gradual stop and then hover in-place. However, at close distances, the non-negligible value of the modeled repulsive force would (at least in this example) cause first aircraft to come to a stop and then "bounce back" away from second aircraft as a way of modeling a repulsive force between the two aircrafts since they are too close to each other. This may, for example, signal or otherwise remind pilot to stay away from the other aircraft and/or that the other aircraft is off limits. In some embodiments, as the value of the modeled repulsive force increases (e.g., because the two aircrafts are closer to each other) the amount of displacement or "bounce back" may be greater.

In another example of how modeled repulsive force may be used to model a repulsion between two aircrafts, the modeled repulsive force may correspond to how much displacement in the joystick is required (e.g., towards the other, repelling aircraft) in order for an aircraft to hover in-place (e.g., when two aircrafts get too close to each other). During normal operation (e.g., when one aircraft is not too close to another aircraft), a neutral or centered joystick position would cause the aircraft to hover in-place. However, in some embodiments, if first aircraft and second aircraft are too close to each other, an active or definite displacement of the joystick, other hand control, or the like, may be required to keep the aircraft hovering in-place. In some embodiments, a pilot would have to push the joystick further away from center in order to hover in-place more as two aircrafts get closer to each other (e.g., a smaller joystick displacement may be sufficient for in-place hovering when two aircrafts are further away from each other).

In some embodiments, a process to set modeled repulsive force as a type of aircraft movement limit may be exemplified by method F. In certain embodiments, method F relates to at least method A and its steps, among other methods and/or steps as disclosed herein.

In a step or first step of method F, a value may be received for aircraft movement limit, wherein the aircraft movement limit may be associated with a manned aircraft and the value may be determined based at least in part on state information associated with the aircraft, which may include determining a distance between the aircraft and a second aircraft, wherein the state information associated with the aircraft may include the distance, and determining the value for the modeled repulsive force based at least in part on the distance. For example, the value for the modeled repulsive force may be determined or otherwise calculated to be small and/or non-negligible numbers or values when two aircrafts are relatively far apart. For simplicity, and without limitation, the value for the modeled repulsive force may be determined to be zero at distances greater than some threshold (e.g., so that a repulsive modeling or repulsive effect does not come into play at distances above that threshold).

In another or next step of method F, aircraft movement limit may automatically be set to the value. For example, and without limitation, the modeled repulsive force may be set to the value calculated in the manner recited in the prior step.

In another or next step of method F, thrust envelope may be received from pilot. For example, and without limitation, thrust envelope may be received through a joystick, some other input device, or the like.

In another or next step of method F, a control signal for aircraft may be generated using thrust envelope and aircraft movement limit, which may include modeling repulsion between aircraft and a second aircraft based at least in part on the modeled repulsive force. For example, as the value of the modeled repulsive force increases, the control signal would cause aircraft to exhibit more of repulsion between itself and second aircraft.

In some embodiments, control signal may cause aircraft to come to a stop and subsequently move away from second aircraft in response to an input device of aircraft returning to a neutral position after being in a position associated with aircraft flying towards second aircraft. For example, and without limitation, the larger the modeled repulsive force is, the more "bounce back" there would be.

In some embodiments, an amount of displacement by an input device of aircraft in order for aircraft to hover in-place may vary based at least in part on the modeled repulsive force. For example, the larger the modeled repulsive force is, the more displacement from center (e.g., for a joystick) could be required to keep aircraft hovering in-place.

In some embodiments, an aircraft's altitude may be used to adjust or otherwise set a velocity limit. In an exemplary embodiment, different altitudes of aircrafts may affect their velocity limit(s). In this example, a first, higher aircraft may be at a high (e.g., absolute) altitude whereas a second, lower aircraft may be at a low (e.g., absolute) altitude. In this example, and without limitation, first aircraft may be at a high (absolute) altitude, for example, and without limitation, on the order of 3 meters or higher. Second aircraft may be at a low (e.g., absolute) altitude, for example, and without limitation, at or below the threshold of 1 meter. If something happened to higher first aircraft (e.g., a propulsor or rotor malfunctions or goes out), the higher aircraft would have more time to slow down (e.g., using a parachute and/or by spinning up the working propulsors or rotors) before hitting the water compared to the lower second aircraft. Stated differently, if both higher first aircraft and lower second aircraft were traveling at the same forward velocity and hit the water due to a propulsor or rotor failure (as an example), the lower aircraft would be more likely to hit the water at a higher and more dangerous velocity compared to the higher aircraft. To prevent injury to pilot of lower second aircraft, as the aircraft approaches the surface of the water one or more velocity limits may generally be reduced. In some embodiments, velocity limits in multiple or all directions (e.g., vertically, laterally, forward, within a horizontal plane, etc.) may be reduced. This may ensure that even if a low-flying aircraft crashes, it is going slower so that there will be less damage.

Such a technique may also be used to slow an aircraft down at altitudes where there are more likely to be obstacles. For example, at 50 feet up, there may be no trees, power lines, or rooflines to worry about. However, at 10 feet up, pilot may have to maneuver around those obstacles and flying around those obstacles would be easier and safer if aircraft had a lower velocity limit.

Unlike some earlier velocity limit examples, the lowest velocity limit in this example may be set to a non-zero value. Reducing velocity limit(s) to zero at the lowest range of altitudes would prevent an aircraft from landing or more generally flying near to the ground or water which could be undesirable. In some embodiments, similar to the shoreline distance graphical example discussed above, there may be multiple step-downs or limit values applied. In some embodiments, the limit values may be gradually or otherwise continuously decreased.

In an exemplary embodiment, of how this may fit into method E, aircraft movement limit (see, e.g., step or first step of method E) may include a velocity limit and the value may be determined based at least in part on state information associated with aircraft (see step or first step of method E), which may include determining an altitude associated with aircraft (where the state information associated with aircraft includes the altitude). The value for velocity limit may be determined based at least in part on the altitude where a first, higher value may be determined for velocity limit based at least in part on a first, higher altitude (see, e.g., higher first aircraft above) and a second, lower value may be determined for velocity limit based at least in part on a second, lower altitude (see, e.g., lower second aircraft above).

In some embodiments, an aircraft's velocity may be used to select a value for an attitude limit. In an exemplary embodiment, attitude limit may be adjusted based on an aircraft's velocity. In such an example, propulsors or rotors of aircraft can break if too much stress is applied to them. To prevent propulsors or rotors from snapping or otherwise breaking, aircraft's attitude limit may be set or otherwise adjusted based on the velocity of the aircraft. In this example, a first aircraft may be flying at a relatively slow velocity. At this velocity, propulsors or rotors of first aircraft may be better able to withstand the stress due to flying at this velocity and at larger attitudes (for example, and without limitation, in a nose-down position). As such, the value for the attitude limit (a type of aircraft movement limit, among others) may be set to some larger, more permissive value. A second aircraft may be flying at a faster velocity and may therefore be less able to withstand the same, steeper attitude as that for first aircraft. As such, because of its faster velocity, a lower value may be selected for second aircraft's attitude limit. Generally speaking, as the velocity of an aircraft increases, the value selected for an attitude limit may be reduced. For completeness, it should be noted that exemplary aircraft of such an example may be capable of flying in a nose-up position and an attitude limit may relate to a limit on a nose-up position and/or a nose-down position. In some embodiments, there may be two independent and/or different attitude limits: one for the nose-up limit and one for the nose-down limit. In some embodiments, the technique described herein may be used to select a value for a nose-up limit. In other embodiments, a value for a nose-down limit may be selected with efficacy, as needed or desired.

In an exemplary embodiment, of how this may fit into method E, aircraft movement limit (e.g., referred to in a step or first step of method E) may include an attitude limit and the value may be determined based at least in part on state information associated with aircraft (see, e.g., a step or first step of method E), which may include determining a velocity associated with aircraft (where the state information associated with aircraft includes the velocity). The value for the attitude limit may be determined based at least in part on the velocity wherein a first, lower value is determined for the attitude limit based at least in part on a first, higher velocity (see, e.g., second lower aircraft above) and a second, higher value may be determined for the attitude limit based at least in part on a second, lower velocity (see, e.g., first higher aircraft above).

In some embodiments, state information may be used to select a value for aircraft movement limit and may be associated with an electrical and/or non-physical state. For example, state information may associated with motor commands and/or thrust signals. In an exemplary embodiment, a pilot-induced oscillation in motor command and/or thrust may be corrected by a velocity limit. In such an example, a desired motor command or thrust signal and an actual motor command or thrust signal may have some offset (e.g. phase lag or lead) as a function of time. An inexperienced pilot may sometimes overcorrect which may introduce or otherwise causes an oscillation. The two signals (desired and actual) may gradually diverge over time (due to the pilot's actions) and begin to oscillate. These oscillations may grow larger and the phase difference between the two signals may eventually approaches a 180° phase difference.

To address this, in some embodiments, when the system (e.g. controller such as flight controller 124 of FIG. 2A) detects that the phase difference or lag between a desired (e.g., motor command and/or thrust) signal and an actual (e.g., motor command and/or thrust) exceeds some phase difference threshold, one or more velocity limits may be reduced. This may have the effect of dampening or otherwise reducing the input from pilot (e.g., via joystick, other input device, or the like) so that the pilot cannot continue to introduce a pilot-induced oscillation. System, without the overcorrection from the pilot, would eventually be able to correct itself and the two signals should begin to converge again (e.g., characterized by a reduced phase lag). In some embodiments, once the phase lag goes down to some sufficient degree or amount, velocity limits may be returned to their previous values.

In an exemplary embodiment, of how this may fit into method E, aircraft movement limit (e.g., referred to in a step or first step of method E) may include a velocity limit and the value may be determined based at least in part on state information associated with aircraft (see, e.g., step or first step of method E), which may include determining a phase difference between a desired motor command signal and an actual motor command signal where the state information associated with the aircraft includes the phase difference. The value for velocity limit may be determined based at least in part on the phase difference where a first, lower value may be determined for the velocity limit based at least in part on a first, higher phase difference (e.g., when the phase difference gets relatively close to 180°, the velocity limit is reduced) and a second, higher value is determined for the velocity limit based at least in part on a second, lower phase difference (e.g., when the phase difference goes back to normal or a nominal value closer to 0°, the velocity limit is increased).

In some embodiments, a (e.g., training) flight or session may be evaluated (e.g., using some analysis process) to determine whether to increase a constraint or limit (e.g., associated with position (including altitude), velocity, etc., among others) or keep it the same. For example, and without limitation, if a pilot demonstrated safe or good pilot behavior, a constraint or limit may be increased. Otherwise, a constraint or limit may remain unchanged. Method G represents an exemplary process which may be used to determine a value for aircraft movement limit by analyzed recorded flight information. In some embodiments, the process of method G may be performed by a central server, controller, or the like, managed by an aircraft manufacturer. In the context of method A, the value for aircraft movement limit received at a step or first step of method A may be selected or otherwise determined using the process of method G. One benefit, without limitation, to this technique may be that aircraft movement limits can be managed centrally and/or consistently (e.g., instead of having one (e.g., human) tester with stricter standards at one location and another (e.g., human) tester with looser standards at another location). Also, this technique may permit pilots to learn how to fly the aircraft and be assessed even if they are located in remote locations far from service and/or sales locations. In some embodiments, the process of method G may be performed by a controller such as flight controller 124 of FIG. 2A.

At a step or first step of method G, recorded flight information, including an identifier associated with pilot, is received. For example, and without limitation, recorded flight information may include position information, velocity information, and acceleration information from when an aircraft is turned on until the aircraft is turned off. In various embodiments, recorded flight information may be exchanged via a variety of intermediary devices. In one example, there may be an application running on a smartphone which may communicate with aircraft and store recorded flight information. Recorded flight information may then be sent from the application/smartphone to a central server (e.g., when the app/smartphone has access to a WiFi connection and/or is charging). In another example, recorded flight information may be sent to central server via a base station (such as those disclosed herein including above). In some embodiments, recorded flight information may be communicated via, for example and without limitation, a satellite, a mobile network, radio, and the like, among others. Controller, such as flight controller 124 of FIG. 2A, and/or other computing device may be used to facilitate communication of recorded flight information, as needed or desired.

At another or next step of method G, recorded flight information may be analyzed. In various embodiments, the analysis tries to find or otherwise identify good or bad flying in recorded flight information. For example, a sudden acceleration or deceleration may be indicative of someone who is reckless and/or cannot adequately control aircraft. Alternatively, smooth accelerations and decelerations may be indicative of a safe pilot. Analysis may be done in any number of ways. In some embodiments, a machine learning process, model, algorithm and/or model may be utilized to conduct analysis. Any of the machine learning embodiments as disclosed herein may be used for this purpose, as needed or desired.

Some other examples may include looking for pilot-induced oscillation by comparing a phase difference between an actual motor command and/or thrust signal and a desired motor command and/or thrust signal (as discussed above). Pilot-induced oscillation may be indicative of poor flying. And the number of pilot-induced oscillations in recorded flight information may be used to classify a pilot as a good (and/or safe) pilot versus a bad (and/or unsafe) pilot.

In some embodiments, recorded flight information may be analyzed to identify a number of times a pilot tried to cross some boundary or otherwise enter a prohibited (air)space where aircraft automatically prevents the pilot from entering (e.g., a geofence). This number of attempted incursions may be used to classify pilot. In some embodiments, aircraft may not be prohibited from flying in a particular airspace (e.g., there is no geofence to keep the aircraft out) but flying in that space may be undesirable and/or unsafe. For example, although not prohibited from flying over land, it may be preferable or desirable that aircraft stay over water since this may be safer in the event of a crash. In some embodiments, the number of times or time spent over land, or a particular terrain, may be assessed. Some standards for ultralight aircraft may prohibit such aircraft from flying at night, as well as over inhabited areas and recorded flight information may be analyzed for this type of behavior.

In some embodiments, aircraft may issue a warning but may not automatically prevent pilot from flying in a particular manner. For example, warning may relate to flying too low or high, flying too fast, etc. In some embodiments, if flight behavior (e.g., once a warning is issued) does not change within a certain amount of time, pilot may be assumed or otherwise determined to be ignoring the warning and the analysis of recorded flight information may count the number of ignored warnings in order to classify pilot.

At another or next step of method G, value for aircraft movement limit may be determined based at least in part on the analysis of recorded flight information. For example, if bad flying behavior is detected, the same or a more restrictive value for aircraft movement limit may be selected or otherwise determined (e.g., keep altitude limits, velocity limits, and/or distance from shoreline limits the same or reduce). Alternatively, if good flying behavior is detected, then more permissive values may be selected or otherwise determined (e.g., increase altitude limits, velocity limits, and/or distance from shoreline limits).

At another or next step of method G, the value for aircraft movement may be sent to aircraft using the identifier associated with pilot. For example, aircraft, as part of the starting up may identify pilot and retrieve the appropriate aircraft movement limits for that pilot. A variety of methods may be used to perform this step of method G. For example, all values for all pilots could be pushed out and aircraft selects the appropriate values based on the pilot's identifier. Or, a pull technique could be used where aircraft uploads pilot's identifier to central server, controller, computing device, or the like, and the appropriate value(s) for that pilot is/are downloaded in response. As before, this information may be exchanged via an application (app) running on a smartphone, a base station or a controller (e.g. flight controller 124 of FIG. 2A).

In some embodiments, multiple pilots have access to a given flyer or aircraft. A variety of techniques may be used to uniquely identify a pilot (e.g., biometrics, a code/password, a fob or other near-field identifier, an app running on a smartphone, etc.). In some embodiments, a startup sequence may include identifying the pilot and loading those pilot's limits or constraints into system, controller such as flight controller 124 of FIG. 2A, computing device, or the like. In various embodiments, limits or other settings associated with a pilot may be stored locally and/or remotely/centrally, as needed or desired. For example, aircraft may store a limited number of settings (including limits) locally on the aircraft. If it cannot locate a pilot's settings there, it may go to some server, controller, computing device, or the like (e.g., at base station or via the base station). If a pilot's settings cannot be located (e.g., a new pilot), then some default settings and/or limits may be loaded.

Such a process may be useful because aircraft can start out in a "safe mode" for novice users and gradually open up the configurations or modes (e.g., permit faster flight, higher flight, etc.) even in remote locations where there may be no instructor or evaluator present to evaluate the quality of pilot's flying in person. Analyzing recorded flight information may also apply a uniform standard across all pilots whereas human assessment can be inconsistent between one person and another (e.g., one instructor or evaluator may be more lenient and/or have lower standards about flying than another instructor or evaluator).

Figure 3:
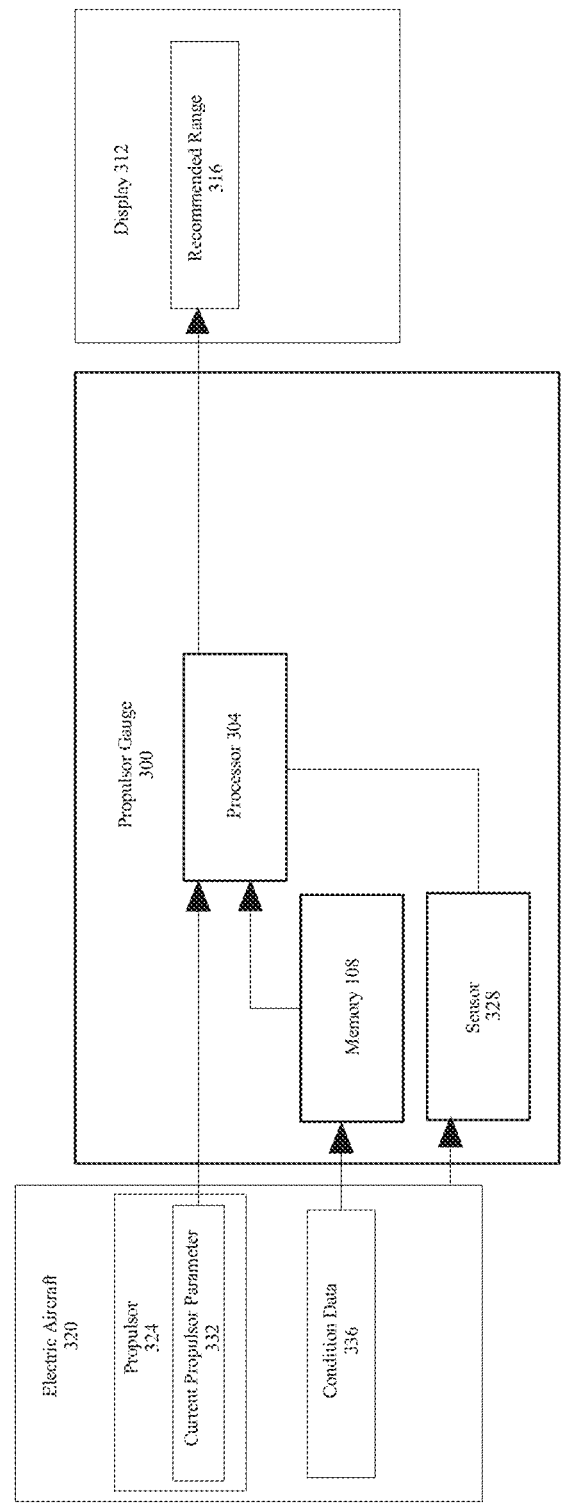
FIG. 3 is a block diagram of an exemplary embodiment of a propulsor gauge in accordance with one or more embodiments of the present disclosure.

Now referring to FIG. 3, an exemplary embodiment of a propulsor transition gauge 300 in accordance with one or more embodiments of the present disclosure. In one or more embodiments, propulsor gauge 300 (also referred to in this disclosure as a "gauge", "transition gauge", or "propulsor gauge") may include a digital primary flight display (PFD). As discussed further below, gauge 300 is configured to guide a pilot through a transition of an aircraft propulsion assembly, such as a propulsor, during flight. For the purposes of this disclosure, a "transition" is a change of a propulsion assembly between a vertical flight position to a horizontal flight position. A propulsion assembly may include, for example and without limitation, a propulsor, which may include a rotor or propeller. In some embodiments, gauge 300 may include a tachometer that measures and shows a working speed, such as revolutions per minute (RPM) of one or more propulsors of an electric aircraft. In one or more embodiments, gauge 300 may include a processor 304. Processor 304 may be in communication with a computing device or be part of a computing device. Processor 304 may include any computing device as described in this disclosure, including without limitation a processor (e.g., processor 304), control circuit, microcontroller, microprocessor, digital signal processor (DSP), system on a chip (SoC), and the like. Computing device may include a computer system with one or more processors (e.g., CPUs), a graphics processing unit (GPU), or any combination thereof. In some embodiments, computing device may include a memory 308. In other embodiments, computing device and/or processor may be communicatively connected to and separately from memory 308. Memory 308 may include a memory, such as a main memory and/or a static memory, as discussed further in this disclosure below. In some embodiments, computing device may include a display 312, as discussed further below in the disclosure. In other embodiments, computing device and/or processor may be separate and communicatively connected to display 312. In one or more embodiments, computing device may include, be included in, and/or communicate with a mobile device, such as a mobile telephone, smartphone, tablet, and the like. In one or more embodiments, computing device may include an electronic flight instrument system (EFIS) in a cockpit of an electric aircraft. Computing device may be part of or in communication with a glass cockpit or a round dial cockpit. Computing device may include a single computing device operating independently, or may include two or more computing devices operating in concert, in parallel, sequentially, or the like. Two or more computing devices may be included together in a single computing device or in two or more computing devices. Computing device may interface or communicate with one or more additional devices, as described below in further detail, via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 304 may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks, as described below, across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of gauge and/or corresponding computing device.

With continued reference to FIG. 3, processor 304 may be designed and/or configured to perform any method, method step, or sequence of method steps in any embodiment described in this disclosure, in any order and with any degree of repetition. For instance, processor 304 may be configured to perform a single step or a sequence of steps repeatedly until a desired outcome or commanded outcome is achieved. Repetition of a step or a sequence of steps may be performed iteratively and/or recursively using outputs of previous repetitions as inputs to subsequent repetitions, aggregating inputs, and/or outputs of repetitions to produce an aggregate result, reduction or decrement of one or more variables such as global variables, and/or division of a larger processing task into a set of iteratively addressed smaller processing tasks. Processor 304 may perform any step or sequence of steps as described in this disclosure in parallel, such as simultaneously and/or substantially simultaneously performing a step two or more times using two or more parallel threads, processor cores, or the like. Division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, gauge 300 includes memory 308. Memory 308 may be communicatively connected to processor 304 and may be configured to store information and/or data related to gauge 300, such as propulsor data, environment data, electric aircraft data, and the like. Memory 308 may include one or more memory devices to store data and information and/or datum related to a slight transition of electric aircraft 320. Memory 308 may include various types of memory for such information storage, such as EEPROM (Electrically-Erasable Read-Only Memory), flash memory, volatile memory, non-volatile memory, RAM (Random-Access Memory), ROM (Read-Only Memory), a disk drive, and the like. In various embodiments, processor 304 may be configured to execute software instructions stored on memory 308 to perform various methods, processes, or operations in the manner described in this disclosure. In one or more embodiments, memory 308 is communicatively connected to processor 304 and configured to contain instructions configuring processor 304 to determine a recommended range 316, as discussed further below in this disclosure. In one or more embodiments, recommended range 316 may include a recommended range for, for example, one or more thrust parameters. In some embodiments, recommended range 316 may include a recommended range for a velocity of electric aircraft 320. In some embodiments, recommended range 316 may include a recommended range for an attitude of electric aircraft 320. Memory component 340 may be configured to store information and data related to recommended range 316, electric aircraft 320, parameters, and the like. In one or more embodiments, memory 308 may include a storage device, as described further in this disclosure below. In one or more embodiments, memory 308 may store a database such as a database related to electric aircraft. Memory 308 may store upper and lower bounds of a band of gauge 300 in a lookup table, as discussed further below in this disclosure. In one or more embodiments, recommended range 316 may be determined using machine-learning. For instance, and without limitation, a generated machine-learning model may determine gradations of recommended range 316. A gradation may include various recommended parameters based on desirability for reducing load on electric aircraft while maintaining lift during flight transition. For example, and without limitation, a first gradation may represent an optimal or targeted zone, where an optimal zone is an ideal zone that a user should stay within, such as a recommended range 316. A second gradation may include a buffer zone, which may include an upper bound and a lower bound, as discussed further in this disclosure. An upper bound may be, for example and without limitation, related to structural limitations. For instance, and without limitation, as electric aircraft moves forward in horizontal flight, loads get added to rotational velocity of lift propulsors, which result in high loads. Furthermore, lift propulsors may experience a rolling moment when aircraft is moving horizontally as a result in difference in lift generated by the proceeding propulsor and the receding propulsor. A lower bound may be, for example and without limitation, related to lift and the avoidance of downwash from lift propulsors. For instance, and without limitation, if lift propulsors begin moving in their own previously created downwash, which results in turbulence and a decrease in lift, then electric aircraft will begin to descend and/or fall. Lower bound and upper bound may not be recommended like an optimal zone, but a user may allow a thrust envelope parameter to reside in lower or upper bound without hazardous repercussions, such as dangerous loads on propulsor or insufficient lift due to downwash.

Upper and lower bound provide. Machine-learning model may modify gradations based on various factors and/or parameters, such as external factors like forward speed, exterior temperature, motor temperature, and the like. For example, and without limitation, an upper bound for an RPM parameter may be lowered if speed is increase or if an external and/or environmental ambient temperature is high. In another example, and without limitations, a lower bound may be increased if fixed wings of an electric aircraft begin to generate lift. In one or more embodiments, gradations may be determined using machine-learning, as previously mentioned in this disclosure. In other embodiments, gradations may be determined using, for example, a lookup table. A lookup table may be stored in a database, such as in a memory of computing device, or may be retrieved from, for example, a third-party application. Computing device may retrieve or receive information from lookup table to display gradations, such as recommended range 316.

In one or more embodiments, gauge 300 may be used on any aircraft capable of transitioning a flight mode (e.g., from hover to conventional flight, or vice versa). For example, aircraft may include an electric vertical takeoff and landing (eVTOL), a VTOL, a tilt rotor, a tiltwing, and/or a helicopter. Aircraft may include an electric aircraft, which may be any aircraft powered by electricity, such as one or more electric motors and/or battery systems. In some embodiments, electric aircraft may be powered solely by electricity. In other embodiments, electric aircraft may be partially powered by electricity, such as a hybrid-electric aircraft. Gauge 300 may assist a pilot in a transition of an aircraft by providing a recommended range of operation, such as a recommended range for an RPM of a propulsor of aircraft, which must be maintained by a thrust envelope parameter, such as a current RPM of a propulsor, to safely and readily transition aircraft from one mode of flight to another mode of flight, as discussed in further detail below. Transition between flight modes of an electric aircraft may be consistent with disclosure of U.S. patent application Ser. No. 17/825,371 filed on May 26, 2022, and titled "AN APPARATUS FOR GUIDING A TRANSITION BETWEEN FLIGHT MODES OF AN ELECTRIC AIRCRAFT", the entirety of which is incorporated by reference herein in its entirety.

With continued reference to FIG. 3, processor 304 is configured to identify a thrust envelope parameter 332 of propulsor 324. For the purposes of this disclosure, a "thrust envelope parameter" is a characteristic of a propulsor, such as a propeller, in real time. Thrust envelope parameter 332 may include a rotational speed or revolutions per minute (RPM) of propulsor 324 and/or a corresponding motor of propulsor 324. Processor 304 may identify thrust envelope parameter 332 by receiving a detected measurement from a sensor 328, as discussed further in this disclosure. Though thrust envelope parameter is described as an RPM of a motor of electric aircraft during flight transition, as understood by one of ordinary skill in the art, thrust envelope parameter may be applicable to other parameters of flight of electric aircraft, such as an angle of attack, thrust, torque, power consumption, angular velocity, climb rate, structural limitations of electric aircraft, environmental and/or external limitations surrounding electric aircraft, and the like. In one or more embodiments, thrust envelope parameter may include a parameter used by an electric aircraft to transition between vertical flight and horizontal flight and to maintain a correct amount of lift by the electric aircraft during the transition of operation modes.

In one or more embodiments, sensor 328 may include an encoder. A detected measurement may include a direct reading of a speed or RPM of propulsor 324. Detected measurement may include measurements of other characteristics of propulsor 324 that may be used by processor 304 to calculate thrust envelope parameter 332. For example, a measurement of an actuation of a pilot control, such as a pushing of a throttle lever, may be used to identify a thrust envelope parameter. A pilot control may include, for example and without limitation, a wheel, pedal, button, switch, knob, lever, stick, or any other device and or mechanism used by a pilot to control movement of electric aircraft 320 through a medium. Gauge may indicate a rotational speed of one or more propulsor and/or motor or shaft operatively connected to propulsor 324. Thrust envelope parameter 332 may include lift, torque, motor current, motor voltage, propulsor angle and/or tilt, and the like. In some cases, thrust envelope parameter 332 includes a unitless or proportional parameter, such as speed or throttle. In other cases, thrust envelope parameter 332 may include a pilot input position, such as an angular position on lift lever or throttle wheel, as previously mentioned above. In one or more embodiments, sensor 328 may include one or more shaft (rotary type) encoder, photoelectric (optical type) sensor, and/or magnetic rotational speed (proximity type) sensor to detect an RPM or rotational speed of motor and/or propulsor 324 of electric aircraft 320.

Still referring to FIG. 3, a sensor 328 may be communicatively connected to processor 304. Sensor 328 may be configured to detect and transmit a thrust envelope parameter 332, condition data 336, and the like. For the purposes of this disclosure, condition data 336 is any factor or characteristic of electric aircraft that may affect a transition of flight of electric aircraft. In one or more embodiments, a condition datum may include an RPM, angle of attack, thrust, torque, power consumption, angular velocity, climb rate, structural limitations of electric aircraft, environmental and/or external limitations surrounding electric aircraft, such as wind or an ambient temperature of an external environment of electric aircraft, a power source condition, and the like. In one or more embodiments, thrust envelope parameter may include a parameter indicating a used by an electric aircraft to transition between vertical flight and horizontal flight and to maintain a correct amount of lift by the electric aircraft during the transition of operation modes. In one or more embodiments, thrust envelope parameter and condition data may be inputted by, for example, a user, or detected by, for example, a sensor, such as sensor 328. Sensor 328 may include one or more sensors. For example, sensor 328 may include a sensor array or a plurality of individual sensors.

In one or more embodiments, sensor 328 may include an encoder. In one or more embodiments, gauge 300 and/or electric aircraft 320 may include an encoder. An encoder may be configured to detect and determine a motion of motor of propulsor 324. For example, and without limitation, encoder may be a rotary encoder. In one or more exemplary embodiments, encoder is configured to determine a motion of motor and/or propulsor, such as a speed in revolutions per minute of motor. Encoder is configured to transmit an output signal, which may include feedback, to processor 304.

Still referring to FIG. 3, sensor 328 may include a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 328 may include, torque sensor, gyroscope, accelerometer, magnetometer, inertial measurement unit (IMU), pressure sensor, force sensor, proximity sensor, displacement sensor, vibration sensor, or the like. For example, without limitation, sensor 328 may include a gyroscope that is configured to detect a current aircraft orientation, such as roll angle.

In one or more embodiments, sensor 328 may include a plurality of weather sensors. In one or more embodiments, sensor 328 may include a wind sensor. In some embodiments, a wind sensor may be configured to measure a wind datum. A "wind datum" may include data of wind forces acting on an aircraft. Wind datum may include wind strength, direction, shifts, duration, or the like. For example, and without limitations, sensor 328 may include an anemometer. An anemometer may be configured to detect a wind speed. In one or more embodiments, the anemometer may include a hot wire, laser doppler, ultrasonic, and/or pressure anemometer. In some embodiments, sensor 328 may include a pressure sensor. "Pressure," for the purposes of this disclosure and as would be appreciated by someone of ordinary skill in the art, is a measure of force required to stop a fluid from expanding and is usually stated in terms of force per unit area. The pressure sensor that may be included in sensor 200 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, a pressor sensor may include a barometer. In some embodiments, a pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

In one or more embodiments, sensor 328 may include an altimeter that may be configured to detect an altitude of aircraft 304. In one or more embodiments, sensor 328 may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. In one or more embodiments, sensor 328 may include an altimeter. The altimeter may be configured to measure an altitude. In some embodiments, the altimeter may include a pressure altimeter. In other embodiments, the altimeter may include a sonic, radar, and/or Global Positioning System (GPS) altimeter. In some embodiments, sensor 328 may include a meteorological radar that monitors weather conditions. In some embodiments, sensor 328 may include a ceilometer. The ceilometer may be configured to detect and measure a cloud ceiling and cloud base of an atmosphere. In some embodiments, the ceilometer may include an optical drum and/or laser ceilometer. In some embodiments, sensor 328 may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, sensor 328 may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, sensor 328 may include a lightning detector. The lightning detector may be configured to detect and measure lightning produced by thunderstorms. In some embodiments, sensor 328 may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet. In some embodiments, sensor 328 may include an inertia measurement unit (IMU). The IMU may be configured to detect a change in specific force of a body.

In one or more embodiments, sensor 328 may include a local sensor. A local sensor may be any sensor mounted to aircraft 304 that senses objects or phenomena in the environment around aircraft 304. Local sensor may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or the like. In one or more embodiments, sensor 328 may include a navigation sensor. For example, and without limitation, a navigation system of aircraft 304 may be provided that is configured to determine a geographical position of aircraft 304 during flight. The navigation may include a Global Positioning System (GPS), an Attitude Heading and Reference System (AHRS), an Inertial Reference System (IRS), radar system, and the like.

In one or more embodiments, sensor 328 may include electrical sensors. Electrical sensors may be configured to measure voltage across a component, electrical current through a component, and resistance of a component. In one or more embodiments, sensor 328 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 328, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

In one or more embodiments, sensor 328 may include a sensor suite which may include a plurality of sensors that may detect similar or unique phenomena. For example, in a non-limiting embodiment, sensor suite may include a plurality of accelerometers, a mixture of accelerometers and gyroscope. System 300 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained. Sensor 328 may be configured to detect pilot input from pilot control and/or controller 312. In one or more embodiments, a pilot control may include buttons, switches, or other binary inputs in addition to, or alternatively than digital controls about which a plurality of inputs may be received. Pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, at least aircraft command. A pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. The manipulation of a pilot control may constitute an aircraft command. A pilot control may be physically located in the cockpit of an aircraft or remotely located outside of the aircraft in another location communicatively connected to at least a portion of the aircraft. A pilot input and/or control may include a collective, inceptor, foot bake, steering and/or control wheel, control stick, pedals, throttle levers, or the like. "Communicatively connected," for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicatively connecting includes electrically coupling an output of one device, component, or circuit to an input of another device, component, or circuit. Communicatively connecting may be performed via a bus or other facility for intercommunication between elements of a computing device. Communicatively connecting may include indirect connections via "wireless" connection, low power wide area network, radio communication, optical communication, magnetic, capacitive, or optical coupling, or the like.

With continued reference to FIG. 3, system 300 includes sensor 328 communicatively connected to aircraft 304. Sensor 328 may be configured to detect, for example, a thrust envelope parameter 332 and/or a condition data 336. Condition datum, or the purposes of this disclosure, may include information and/or data related to actual motion, forces, moments, and/or torques acting on aircraft and/or describing an environmental phenomenon in the real world surrounding electric aircraft. For example, and without limitation, condition data 336 may include geographical data, wind data, electric aircraft specification data (e.g., aircraft type, weight, battery type, battery state of charge, and the like). Condition data 336 may also be used by processor 304, alone or in addition to thrust envelope parameter, to determine recommended range 316.

In various embodiments, sensor 328 may include an inertial measurement unit. An "inertial measurement unit," for the purposes of this disclosure, is an electronic device that measures and reports a body's specific force, angular rate, and orientation of the body, using a combination of accelerometers, gyroscopes, and magnetometers, in various arrangements and combinations.

In various embodiments, sensor 328 may include a plurality of sensors in the form of individual sensors or a sensor array. Sensor 328 may include a plurality of independent sensors, where any number of the described sensors may be used to detect any number of physical or electrical phenomenon associated with electric aircraft 320. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 328 to detect phenomenon may be maintained.

In various embodiments, sensor 328 may be communicatively connected to processor 304, memory 308, display 312, a pilot input, and/or a flight controller so that sensor 328 may transmit and/or receive signals. Signals may include electrical, electromagnetic, visual, audio, radio waves, or another undisclosed signal type alone or in combination. In one or more embodiments, processor 304 may receive an attitude of electric aircraft, such as a yaw, pitch, or roll from sensor 328. In one or more embodiments, processor 304 may be a proportional-integral-derivative (PID) controller. In other embodiments, processor 304 may be a flight controller, which is described further below.

With continued reference to FIG. 3, processor 304 is configured to determine a recommended range 316 as a function of condition parameter 332. In one or more embodiments, thrust envelope parameter 332 may include a current RPM of one or more propellers of electric aircraft. In other embodiments, processor 304 may be configured to determine recommended range 316 as a function of condition parameter 332 and/or condition data 336. Condition parameters may include environmental conditions, electric aircraft characteristics, and the like. For example, and without limitation, condition parameter 336 may include a wind characteristic experienced by electric aircraft. In another example, and without limitation, condition data 336 may include an angle and/or tilt of each propeller of electric aircraft. Condition data 336 may be inputted by a user or retrieved form a database or memory 308. For example, and without limitation, a lookup table and or database may be provided by a user or third-party application that includes electric aircraft specifications, such as, for example, information related to a type of electric aircraft, a battery amperage of electric aircraft, a battery voltage of electric aircraft, a propulsion assembly motor type, a propulsor type, a weight of electric aircraft 320, and the like. In or more embodiments, recommended range 316 may be determined using a machine-learning model, as discussed further below in this disclosure. Though recommended range 316 is described as a recommendation for a user staying in a predetermined RPM during flight transition, as understood by one of ordinary skill in the art, recommended range may be applicable to other parameters of flight of electric aircraft, such as an angle of attack, climb rate, structural limitations, environmental limitations, and the like. Other parameters may be shown in display 312 alone or together.

In one or more embodiments, recommended range 316 may be updated. For example, and without limitation, an initial recommended range 316a may be adjusted to create an updated recommended range 316b based on an updated thrust envelope parameter and/or an updated condition data, for instance as shown below. Recommended range may be continuously adjusted in real-time based on real-time thrust envelope parameters an/or condition data.

Figure 4:
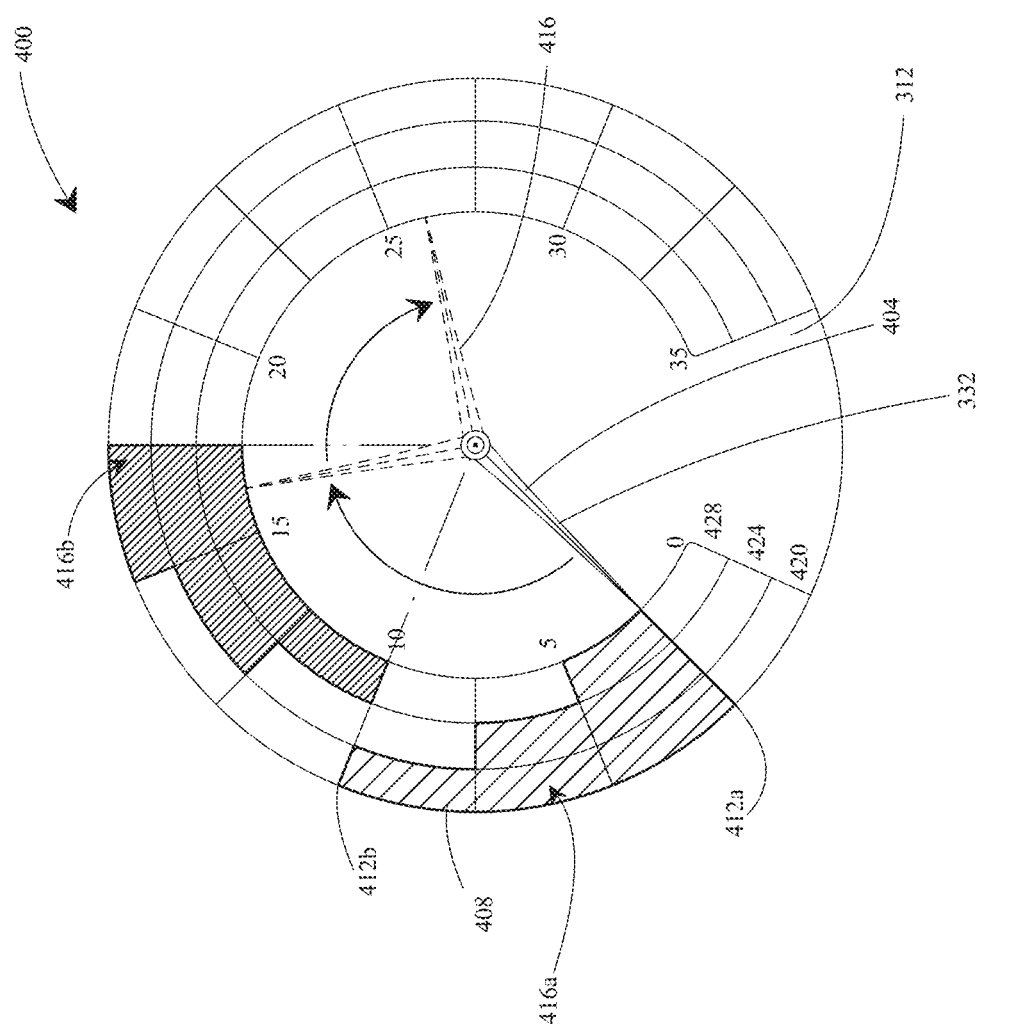
FIG. 4 is schematic diagram of the propulsor gauge in accordance with one or more embodiments of the present disclosure.

Now referring to FIG. 4, an exemplary embodiment of gauge 300 is shown. In one or more embodiments, gauge 300 includes display 312, which is configured to display, present, indicate, and/or otherwise visually and/or verbally convey data and/or information related to a flight transition of electric aircraft 320. For example, and without limitation, display 312 may show recommended range 316, thrust envelope parameter 332, condition data 336, and the like. In another example, and without limitation, information generated by processor 304 or sensor 328 may be shown by display 312. In other examples, and without limitation, information stored in and provided by memory 308 may be displayed on display 308. In various embodiments, display 308 may be implemented with an electronic display screen and/or monitor. Exemplary embodiments of electronic display screen may include a cathode ray tube (CRT), light-emitting diode (LED), liquid-crystal display (LCD), an opaque screen, and the like. In various embodiments, display 308 may be implemented with a projection screen and/or display. For example, and without limitation, display 308 may include a head-up display, a projector screen, a pico-projection display, a retinal display, and the like. In one or more embodiments, display 312 may include a monochrome or color display. Display 312 may be suitable for presenting a user-viewable image of one or more visual representations related to generated and/or provided information discussed in this disclosure. In some embodiments, gauge 300 may also be shown on an existing display of an external and/or remote device, such as a remote computing device, laptop, desktop, mobile phone, tablet, electric aircraft 320 information display system, or any other devices that may receive flight transition information from processor, sensor, memory, a remote computing device, and the like, to present flight transition information to a user. In some embodiments, display 312 may receive and display data and/or information converted and/or generated from processor 304. In other embodiments, display 308 may receive and display collected data and/or information directly from sensor 328. In other embodiments, display 312 may receive and show data and/or information stored and retrieved from memory 308. Data and information from memory 308 may be transferred from memory 308 via processor 304. Display 312 may be configured to present, indicate, or otherwise convey images and or symbols, such as text, related to a flight transition of electric aircraft 320.

With continued reference to FIG. 4, gauge 300 may include an indicator 404 (shown in FIG. 4) that represents a thrust envelope parameter 332, such as an RPM of motor and/or propulsor 324 of electric aircraft 320. Gauge 300 may include physical numerals indicating various values and/or units of a thrust envelope parameter. Indicator 404 may be a physical component moveably mounted to a backing, such as display 312. For example, and without limitation, indicator 404 may include a needle rotatably or slidable attached to display 312 or any other backing. In another example, and without limitation, indicator 404 may include one or more LEDs. In other embodiments, display 312 may show a visual representation of an indicator, such as a needle or other visual marker of a thrust envelope parameter, which indicates a current RPM of one or more propulsor assemblies of electric aircraft 320. For example, and without limitation, gauge 300 may be a display that generates an image mimicking an analog tachometer and/or measuring instrument. Indicator 404 may be coated in a luminescent or reflective paint or material to allow for indicator to be more readily seen by a user, such as self-illuminating tritium or a photoluminescent paint.

With continued reference to FIG. 4, display may show a real-time recommended range 316 that may range with real-time detections from sensors, information from processor 304, and/or inputs from a user, such as a pilot. A visual representation may be used to indicated recommended range 316. Visual representation of recommended range 316 may include a band 408. In some embodiments, band 408 may be a linear region indicated by colors or lines on display 312. In other embodiments, band 408 may include an arcuate region indicated by colors and/or lines on display 312. A position of indicator 404, which represents a thrust envelope parameter such as, for example, RPM of a motor of propulsor or a thrust of electric aircraft, must be maintained so that indicator 404 is directed at recommended range, e.g., pointing at a region between a lower bound 412a of recommended region 316 and upper bound 412b of recommended region 316. Lower bound 412a may represent a lower threshold of recommended range 316, and upper bound 412b may represent an upper threshold of recommended range 316. For a safe and proper transition of modes of operation of electric aircraft a user must use a pilot control to keep indicator 404 between the upper bound and the lower bound of recommended range 316. In some embodiments, lower and upper bound may be generated to include a safety feature, where a standard deviation of error may be included so that recommended range includes relief for user and/or environmental error.

In one or more embodiments, gauge 300 may include an alert component, which may be activated if a position of indicator 404 is outside of recommended range 316, such as position 416 of indicator 404. Alert component may include one or more visual components, audio components, haptic components, and the like. For example, and without limitation, alert component may include a haptic component where a user may feel a vibration in a pilot input when a user deviates outside of recommended range 316 or is close to deviating outside of recommended range 316. In another example, and without limitation, display 312 or a light-emitting diode (LED) may flash to indicate to a user that the user is deviating from a recommended range. Haptic components may include mechanical vibrators, piezoelectric components, or other movable components for generating motion that alerts a user that a recommended range is being exceeded. Audio components may include one or more speakers. Light-emitting components may include one or more light bulbs, LEDs, at least a portion of display 312, and the like.

Sensor 328 may collect data related to a flight transition of electric aircraft 320. Sensor 328 may include one or more sensors. For example, and without limitation, sensor 328 may include a plurality of sensors. Such as a sensor array. Display may display measured and/or detected parameters from sensor 328. Display 312 may be a touchscreen and, thus, provide controls of gauge 300 using screen. In other embodiments, gauge 300 may include a user interface, such as a mechanical interface, with actuated components that are adapted to generate one or more user actuated input control signals. Controls may include one or more buttons, switches, sliders, joysticks, keyboard, pedals, rotatable knobs, a peripheral device, remote device, and the like, that allow a user to navigate an interface, such as a graphic user interface (GUI), displayed on display 312. For example, and without limitation, a user may use controls to toggle between various units of displayed information (e.g., miles per hour (mph), kilometers per hour (kph), revolutions per minute (RPM), and the like) or various menus of graphic user interface or various versions of displaying information (e.g., such as a circular display versus a linear display as shown in FIG. 4 and FIGS. 5-8 below, respectively). In one or more embodiments, processor 304 may process detected sensor data from sensor 328. Processor may then present processed sensor data to a user via display 312.

User interface may be adapted to be integrated as part of display 312 to function as both a user input device and a display device, such as, for example, a touch screen device adapted to receive input signals from a user touching different parts of a screen of display 312. Processor may be configured to sense a user control input signal from user interface and respond to sensed control input signals received therefrom.

Referring now to FIG. 5, a non-limiting example of a linear transition gauge 500 is illustrated. At least a sensor 128 may be configured to detect a movement datum 504 of the electric aircraft. Using aircraft movement data from at least a sensor 128 as described above, movement datum 504 may be detected. In this disclosure, a "movement datum" is a piece of information regarding the movement of electric aircraft 100. Movement datum 504 may include any information regarding the movement of electric aircraft as detected through at least a sensor 128. Movement datum 504 may include speed, velocity, position, altitude, angle of attack and the like. Movement datum 504 may also include weather considerations such as wind speed. Flight controller 124 may be configured to receive movement datum 504 from at least a sensor 128. Flight controller 124 may then be further configured to determine a current flight mode of electric aircraft. A "current flight mode" is an indication of which of the two flight modes, fixed wing or rotor-based, that electric aircraft is currently in. Current flight mode may be determined as a function of movement datum 504. At least a sensor 128 may detect which flight mode electric aircraft 100 is currently flying in through movement datum 504. Current flight mode may be determined as a function of a pilot input 220.

Still referring to FIG. 5, in an embodiment, linear transition gauge 500 may include a display disposed within the cockpit that provides the pilot with crucial information, such as, without limitation, movement datum 504, current flight mode, guidance datum, pilot input, and/or any information related to the electric aircraft's readiness to transition between flight modes (i.e., fixed wing flight mode and rotor-based flight mode) as described above. In some cases, linear transition gauge 500 may be integrated into an existing multifunction display (MFD) within electric aircraft. In other cases, linear transition gauge 500 may be integrated into a dedicated screen (i.e., a separate display).

With continued reference to FIG. 5, in an embodiment, linear transition gauge 500 may be configured to display movement datum 504. In a non-limiting example, linear transition gauge 500 may be digital, displaying movement datum 504 such as the current airspeed as a numerical value via a movement datum indicator 508. As used in this disclosure, a "movement datum indicator" is a portion of linear transition gauge 500 configured to displaying one or more movement datums 504. For instance, and without limitation, movement datum indicator 508 may include a sub-display integrated to linear transition gauge 500 or in another example, and without limitation, movement datum indicator 508 may include a window displayed within linear transition gauge 500, continuously presenting movement datum 504. In some cases, movement datum indicator may be configured with a prominent, easy-to-read numerical value. In a non-limiting example, movement datum indictor 508 may show the current airspeed of the electric aircraft in knots (nautical miles per hour) or other relevant units such as miles per hour (mph) or kilometers per hour (km/h). In an embodiment, linear transition gauge 500 may be configured to dynamically update movement datum indicator 508; for instance, and without limitation, as the electric aircraft's airspeed changes, the digital value displayed on movement datum indicator 508 may be update in real-time to reflect the current airspeed. In a non-limiting example, if electric aircraft is accelerating from 120 knots to 180 knots, the digital value may increase incrementally: 121, 122, 123, . . . , 180, to show, by movement datum indicator 508, the changing airspeed.

With continued reference to FIG. 5, in an embodiment, linear transition gauge 500 may be configured to display guidance datum. In a non-limiting example, linear transition gauge 500 may be digital, displaying guidance datum such as an adjustment suggestion 512 via a guidance datum indicator 516. Adjustment suggestion 512 may include any adjustment suggestion as described above. As used in this disclosure, a "guidance datum indicator" is a portion of linear transition gauge 500 configured to display one or more guidance datums. For instance, and without limitation, a guidance datum indicator may include a visual interface next to, surrounding, or partially covering movement data indicator 508 as described above. In a non-limiting example, guidance datum indicator may include at least two threshold indicators 520a-b, wherein a "threshold indicator," for the purpose of this disclosure, is a visual representation indicating a reference point for determining whether a particular condition or event has been reached or exceeded. For instance, and without limitation, guidance datum 224 may include a minimum lift propulsor revolutions per minute (RPM), represented by a first threshold indicator 520a, and a maximum lift propulsor RPM, represented by a second threshold indicator 520b, wherein both threshold indicators 520a-b may be disposed along a bar 524, wherein the bar 524 represents a range of values, such as a range of lift propulsor RPM, and wherein the first threshold indicator 520a may be disposed below the second threshold indicator 520b. In some cases, at least two threshold indicators 520a-b may be movable along bar 524 based on movement datum 504 such as the current airspeed.

Still referring to FIG. 5, bar 524 may further include an indicator bar 528, wherein the "indicator bar," for the purpose of this disclosure, is a sub-range of the range represented by bar 524. In some cases, indicator bar 528 may be an indication that the pilot is operating the electric aircraft in a correct manner to transition between flight modes. In some cases, guidance datum indicator 516 of linear transition gauge 500 may incorporate color coding to indicate critical guidance datum 224; for instance, and without limitation, at least two threshold indicators 520a-b may be colored in red to emphasize the lift propulsor RPM threshold. In some cases, indicator bar 528 may represent a total lift percentage power. Indicator bar 528 may be displayed in green in between at least two threshold indicators 617a-b. If current lift thrust/lift propulsor RPM (i.e., indicator bar 528) exceed the maximum lift propulsor RPM (i.e., second threshold indicator 520b), forward airspeed may rip the lift propellors of the electric aircraft; on the other hand, if current lift thrust/lift propulsor RPM (i.e., indicator bar 528) dropped below the minimum lift propulsor RPM (i.e., first threshold indicator 520a), the electric aircraft may fall like a stone. The color of indicator bar 528 may change if indicator bar contacts and/or interfaces with first threshold indicator 520a and/or second threshold indicator 520b; for instance, and without limitation, indicator bar 528 may turn red when the indicator bar 528 reaches second threshold indicator 520b and beyond on bar 524. Additionally, or alternatively, guidance datum indicator 516 may display a digital indicator value 532 associated with indicator bar 528, wherein the "digital indicator value," for the purpose of this disclosure, is a numeric value represented digitally, indicating a reading of indicator bar 528. In a non-limiting example, such digital indicator value 532 may include a numeric reading of indicator bar 528 such as "64%."

Referring now to FIG. 6, an additional non-limiting example of an embodiment of linear gauge 500 is illustrated. In an embodiment, indicator bar 528 may have a narrower length and/or a variable length. In some cases, geometry of indicator bar 528 (e.g., length, size, and/or the like) may vary based on pilot input, thrust envelopes, current flight mode, data from at least a sensor 128, or the like. In a non-limiting example, indicator bar may be hovered on top of bar 524, representing a current min/max lift propulsor RPM of electric aircraft, wherein the current min/max lift propulsor RPM may include a shorter range compared to the range of min/max lift propulsor RPM indicated by at least two threshold indicators 520a-b.

Referring now to FIG. 7, guidance datum 224 may further include a pilot error correction datum 700. As used in this disclosure, a "pilot error correction datum" is an indication that counters pilot error indication as described above with reference to FIG. 2. In an embodiment, pilot error correction datum 700 may include information related to fixing the error pilot made. In such embodiment, pilot error correction datum 700 may prompt pilot input 220 to lift lever. In a non-limiting example, pilot error correction datum 700 may include one or more arrows displayed on bar 524, informing pilot to properly operate electric aircraft so that indicator bar 528 may move in the direction the arrows pointed to on bar 524. When the lift thrust of the electric aircraft is high (i.e., indicator bar 528 interfaces with second threshold indicator 520b, as shown in FIG. 7C), pilot error correction datum 700 may be displayed on one end of bar 524 close to second threshold indicator 520b, wherein pilot error correction datum 700 may include a plurality of arrows pointing towards first threshold indicator 520a, informing the pilot to lift the lever in a first direction that may result indicator bar 528 to move towards the first threshold indicator 520a displayed on guidance datum indicator 516.

Referring now to FIG. 8, when the lift thrust of the electric aircraft is low (i.e., indicator bar 528 interfaces with first threshold indicator 520a), pilot error correction datum 700 may be displayed on another end of bar 524 close to first threshold indicator 520a, wherein pilot error correction datum 700 may include a plurality of arrows point towards second threshold indicator 520b, informing the pilot to lift the lever in a second direction that may result indicator bar 528 to move towards the second threshold indicator 520b displayed on guidance datum indicator 516. Additionally, or alternatively, linear transition gauge 500 may issue an aural notification such as, without limitation a DING sound to the pilot during such event of exceedance.

Figure 9:
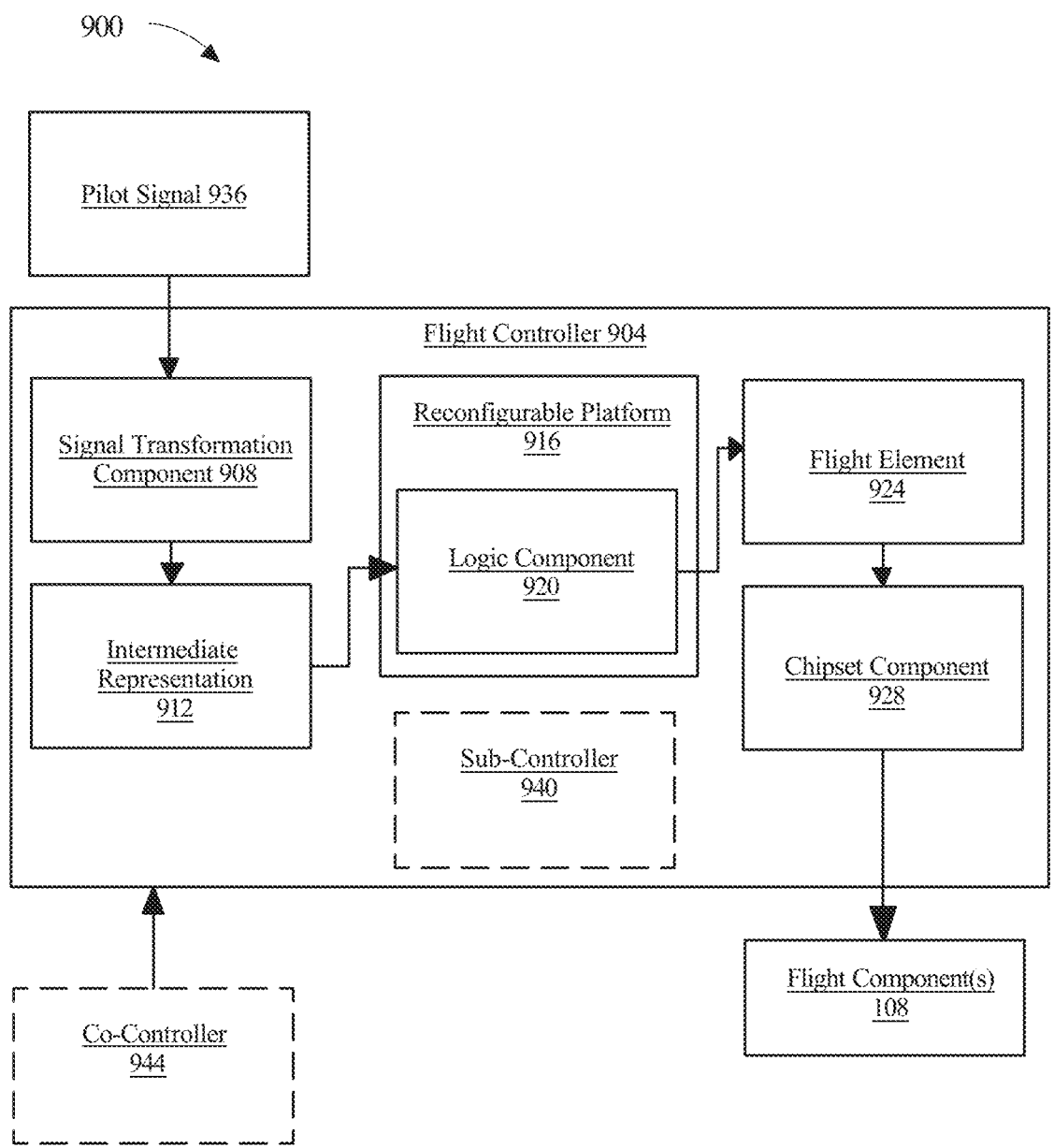
FIG. 9 is a block diagram of an exemplary embodiment of a flight controller.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith. Any of the flight controllers as disclosed herein, including flight controller 124 of FIG. 1 and FIG. 2A and flight controller 904 of FIG. 9, may efficaciously be used in conjunction with any of the embodiments as disclosed herein, including embodiments of systems and methods for controlling flight boundary of an aircraft (e.g. system 100 of FIG. 2A).

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transforming one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q–k–1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 108. As used in this disclosure (and with particular reference to FIG. 9) a "flight component" is a portion of an aircraft that can be moved or adjusted to affect one or more flight elements. For example, flight component 108 may include a component used to affect the aircrafts' roll and pitch which may comprise one or more ailerons. As a further example, flight component 108 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
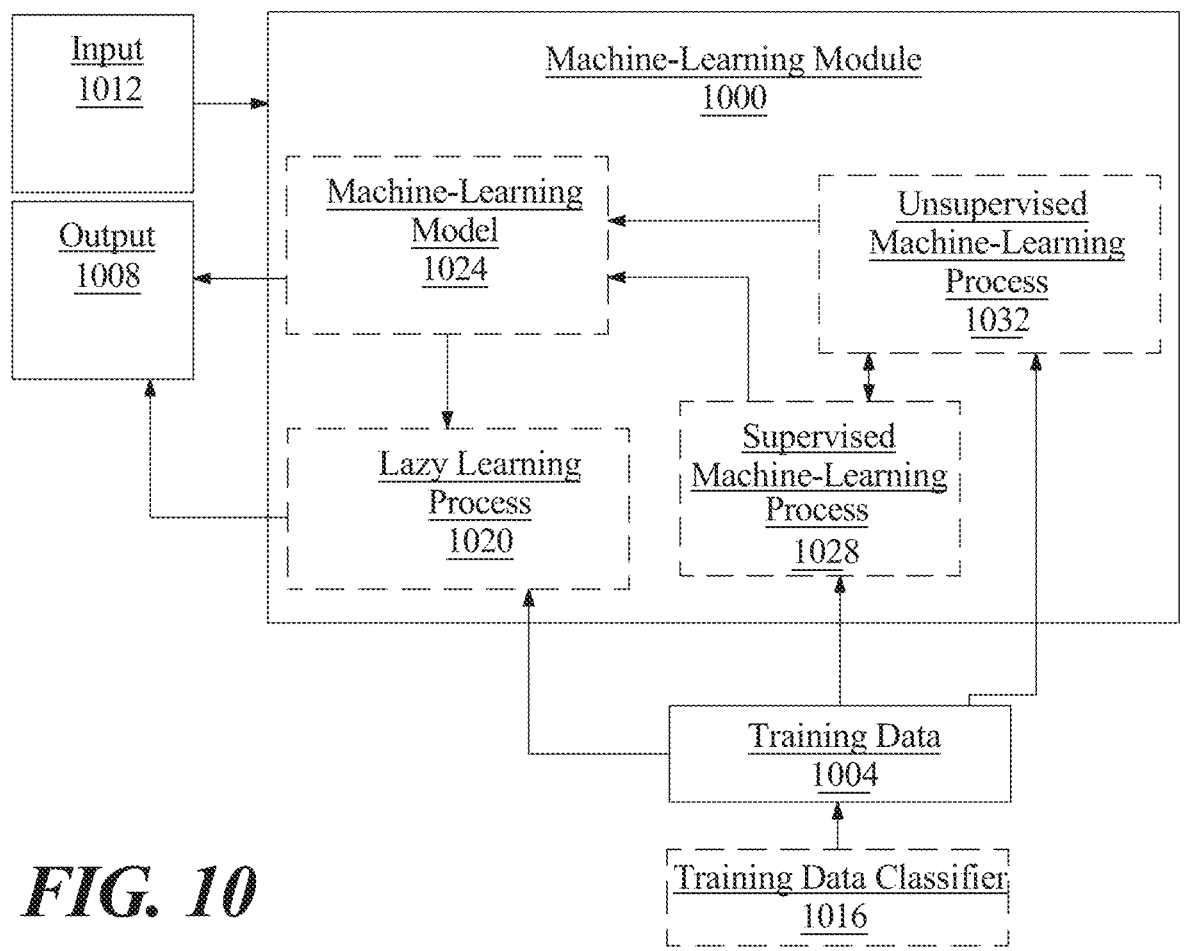
FIG. 10 is a block diagram of an exemplary embodiment of a machine-learning module.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine-learning process," as used in this disclosure, is a process that automatedly uses training data 1004 to generate an algorithm instantiated in hardware or software logic, data structures, and/or functions that will be performed by a computing device/module to produce outputs 1008 given data provided as inputs 1012; this is in contrast to a non-machine learning software program where the commands to be executed are determined in advance by a user and written in a programming language. Any of the machine-learning embodiments as disclosed herein, including machine-learning embodiments described with reference to FIG. 10, may efficaciously be used in conjunction with any of the embodiments as disclosed herein, including embodiments of systems and methods for controlling flight boundary of an aircraft (e.g. system 100 of FIG. 2A) and embodiments of controllers (e.g. flight controller 124 of FIG. 1 and FIG. 2A and flight controller 904 of FIG. 9).

Still referring to FIG. 10, "training data," as used herein, is data containing correlations that a machine-learning process may use to model relationships between two or more categories of data elements. For instance, and without limitation, training data 1004 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a data structure representing and/or using mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation present in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 11:
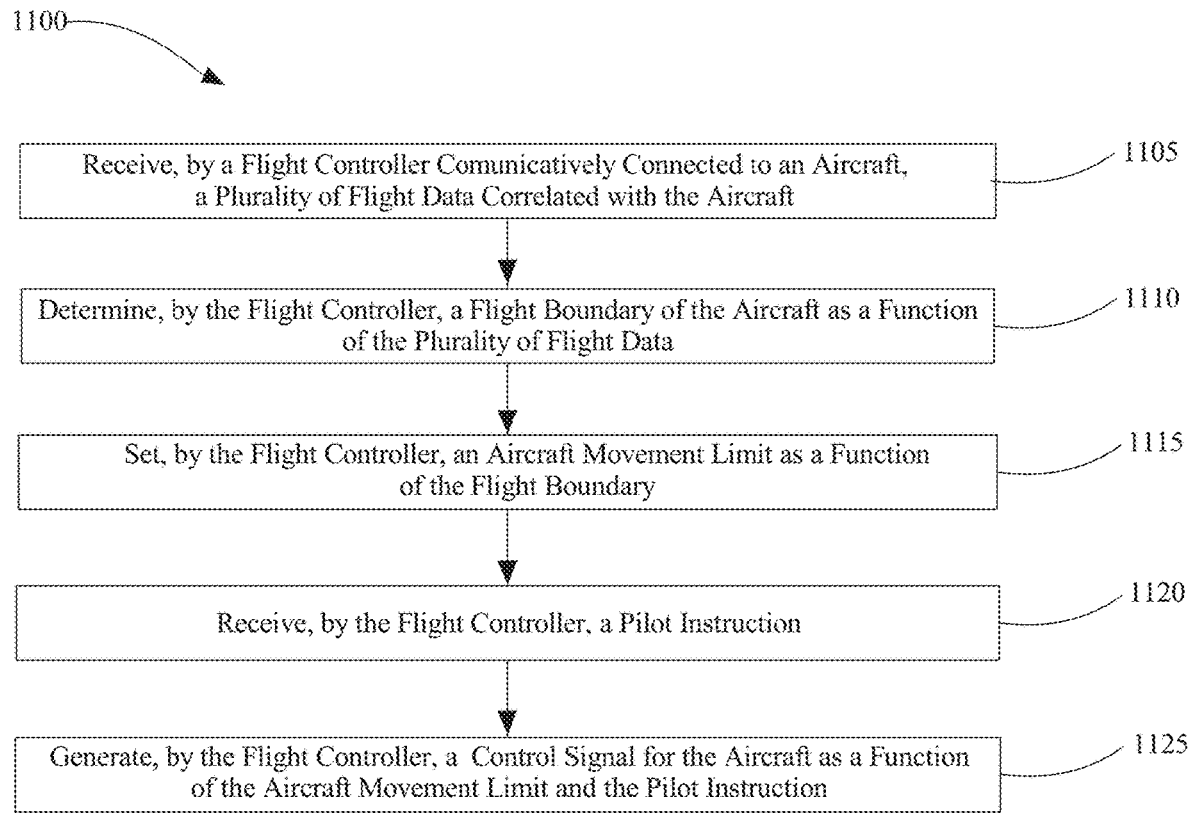
FIG. 11 is a block diagram of an exemplary embodiment of a method for controlling a flight boundary of an aircraft.

Now referring to FIG. 11, an exemplary embodiment of a method 1100 for controlling a flight boundary of an aircraft is illustrated. Aircraft may be any of the aircrafts as disclosed herein and described above with reference to at least FIG. 1.

Still referring to FIG. 11, at step 1105, a plurality of flight data linked with aircraft is received by a flight controller communicatively connected to aircraft. Flight data may include any of the flight data as disclosed herein and described above with reference to at least FIG. 2A. Flight controller may include any of the flight controllers as disclosed herein and described above with reference to at least FIG. 1, FIG. 2A and FIG. 3.

Still referring to FIG. 11, at step 1110, a flight boundary for aircraft is determined by flight controller as a function of plurality of flight data. Flight boundary may include any of the flight boundaries as disclosed herein and described above with reference to at least FIG. 2A.

Still referring to FIG. 11, at step 1115, an aircraft movement limit is set as a function of flight boundary by flight controller. Aircraft movement limit may include any of the any of the aircraft movement limits as disclosed herein and described above with reference to at least FIG. 2A.

Continuing to refer to FIG. 11, at step 1120, a thrust envelope is received by flight controller. Thrust envelope may include any of the thrust envelopes as disclosed herein and described above with reference to at least FIG. 2A.

With continued reference to FIG. 11, at step 1125, a control signal for aircraft is generated by flight controller as a function of aircraft movement limit and thrust envelope. Control signal is configured to limit movement of aircraft to within flight boundary. Control signal may include any of the control signals as disclosed herein and described above with reference to at least FIG. 2A.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
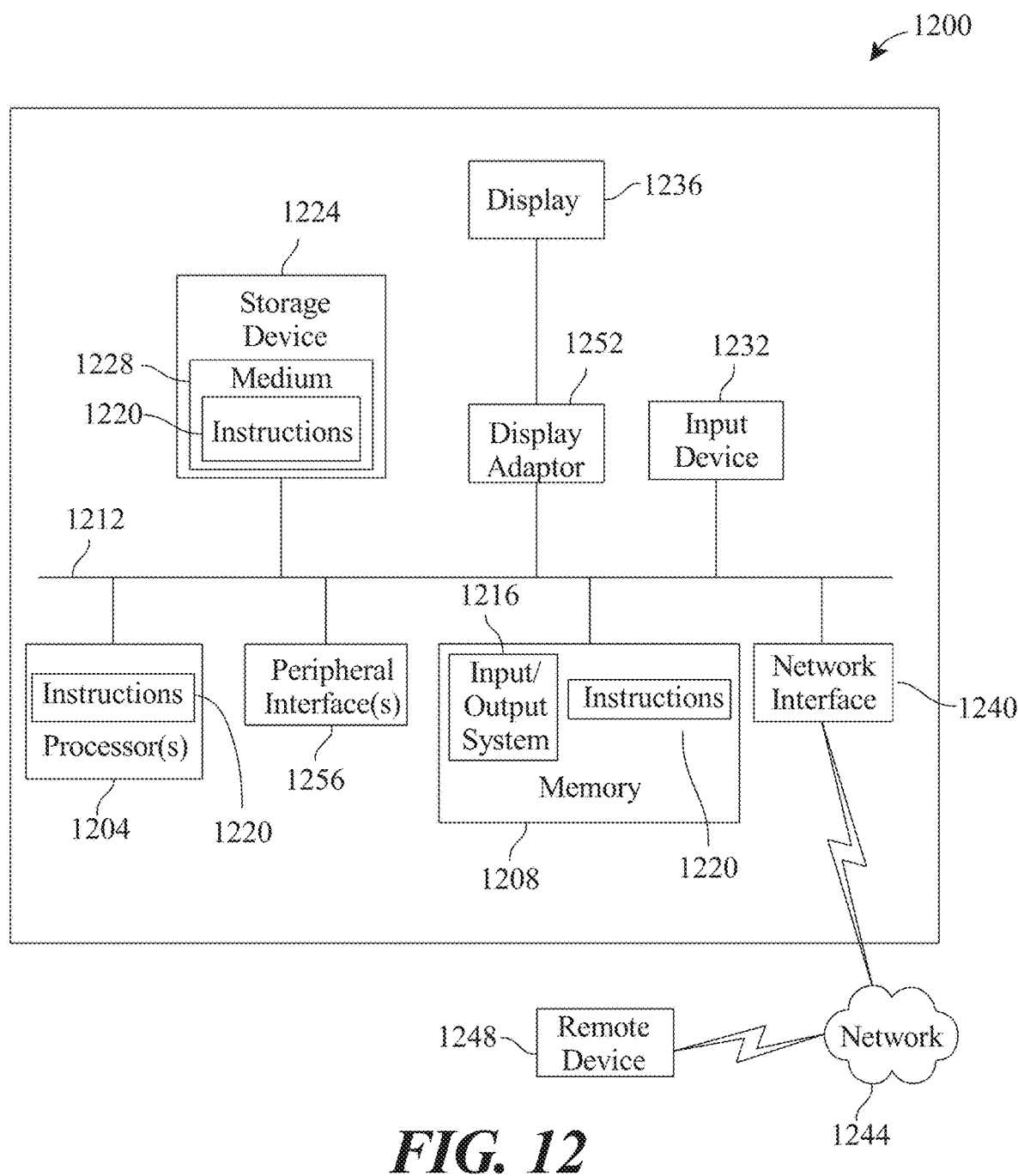
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for controlling a flight boundary of an aircraft, the system comprising:
    a pilot control configured to interface with a pilot and transmit a thrust envelope;
    a flight controller, wherein the flight controller is communicatively connected to the pilot control and an aircraft, wherein the flight controller is configured to:
        receive a plurality of flight data linked with the aircraft, wherein a flight datum of the plurality of flight data comprises a flight component datum informing on an operation of a flight component, wherein the flight component comprises a propulsor component;
        determine a flight boundary for the aircraft as a function of the plurality of flight data;
        set an aircraft movement limit as a function of the flight boundary, wherein setting an aircraft movement limit comprises receiving an instruction, wherein the instruction includes an aircraft identifier and a specified value of the aircraft movement limit;
        receive the thrust envelope, wherein the thrust envelope comprises an instruction to set a thrust envelope parameter; and
        generate a control signal for the aircraft as a function of the aircraft movement limit and the thrust envelope, wherein the control signal limits the aircraft to remain within the flight boundary; and
    an electric propulsor communicatively connected to the flight controller and configured to:
        receive the control signal; and
        control operation as a function of the control signal.

2. The system of claim 1, wherein the flight boundary defines a three dimensional space for a flight trajectory of the aircraft.

3. The system of claim 1, wherein determining the flight boundary for the aircraft further comprises:
    training a machine-learning process with training data correlating aircraft flight data and aircraft flight boundary data; and
    generating the flight boundary for the aircraft as a function of the machine-learning process.

4. The system of claim 1, wherein the plurality of flight data comprises a weather datum.

5. The system of claim 1, wherein the plurality of flight data comprises a location datum.

6. The system of claim 1, wherein the plurality of flight data comprises a flight component datum.

7. The system of claim 1, wherein the plurality of flight data comprises an energy capacity datum.

8. The system of claim 1, wherein the plurality of flight data comprises an aircraft identity datum.

9. The system of claim 1, wherein the aircraft comprises an electric aircraft.

10. The system of claim 1, wherein the aircraft comprises an electric vertical takeoff and landing (eVTOL) aircraft.

11. A method for controlling a flight boundary of an aircraft, the method comprising:
    interfacing, by a pilot control, with a pilot;
    transmitting, by the pilot control, a thrust envelope;
    receiving, by a flight controller communicatively connected to the pilot control and an aircraft, a plurality of flight data linked with the aircraft, wherein a flight datum of the plurality of flight data comprises a flight component datum informing on an operation of a flight component, wherein the flight component comprises a propulsor component;

determining, by the flight controller, a flight boundary for the aircraft as a function of the plurality of flight data;

setting, by the flight controller, an aircraft movement limit as a function of the flight boundary, wherein setting an aircraft movement limit comprises receiving instruction, which includes an aircraft identifier and a specified value of the aircraft movement limit;

receiving, by the flight controller, the thrust envelope, wherein the thrust envelope comprises an instruction to set thrust envelope parameter; and generating, by the flight controller, a control signal for the aircraft as a function of the aircraft movement limit and the thrust envelope, wherein the control signal limits the aircraft to remain within the flight boundary;

receiving, using an electric propulsor communicatively connected to the flight controller, the control signal; and controlling operation of the electric propulsor as a function of the control signal.

12. The method of claim 11, wherein the flight boundary defines a three dimensional space for a flight trajectory of the aircraft.

13. The method of claim 11, wherein determining the flight boundary for the aircraft further comprises:

training a machine-learning process with training data correlating aircraft flight data and aircraft flight boundary data; and generating the flight boundary for the aircraft as a function of the machine-learning process.

14. The method of claim 11, wherein the plurality of flight data comprises a weather datum.

15. The method of claim 11, wherein the plurality of flight data comprises a location datum.

16. The method of claim 11, wherein the plurality of flight data comprises a flight component datum.

17. The method of claim 11, wherein the plurality of flight data comprises an energy capacity datum.

18. The method of claim 11, wherein the plurality of flight data comprises an aircraft identity datum.

19. The method of claim 11, wherein the aircraft comprises an electric aircraft.

20. The method of claim 11, wherein the aircraft comprises an electric vertical takeoff and landing (eVTOL) aircraft.

* * * * *